US012266371B2

(12) United States Patent
Ravelli et al.

(10) Patent No.: US 12,266,371 B2
(45) Date of Patent: Apr. 1, 2025

(54) MULTI-CHANNEL AUDIO ENCODER, DECODER, METHODS AND COMPUTER PROGRAM FOR SWITCHING BETWEEN A PARAMETRIC MULTI-CHANNEL OPERATION AND AN INDIVIDUAL CHANNEL OPERATION

(71) Applicant: Fraunhofer-Gesellschaft zur Foerderung der angewandten Forschung e.V., Munich (DE)

(72) Inventors: Emmanuel Ravelli, Erlangen (DE); Eleni Fotopoulou, Erlangen (DE); Markus Multrus, Erlangen (DE); Guillaume Fuchs, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 441 days.

(21) Appl. No.: 17/492,272

(22) Filed: Oct. 1, 2021

(65) Prior Publication Data

US 2022/0108706 A1 Apr. 7, 2022

Related U.S. Application Data

(63) Continuation of application No. PCT/EP2020/059464, filed on Apr. 2, 2020.

(30) Foreign Application Priority Data

Apr. 4, 2019 (EP) ..................................... 19167449

(51) Int. Cl.
*G10L 19/008* (2013.01)

(52) U.S. Cl.
CPC .................................. *G10L 19/008* (2013.01)

(58) Field of Classification Search
CPC ... G10L 19/005; G10L 19/008; G10L 19/012; G10L 19/0212; G10L 19/173;
(Continued)

(56) References Cited

U.S. PATENT DOCUMENTS 6,393,392 B1 5/2002 Minde
6,487,535 B1 11/2002 Smyth et al.
(Continued)

FOREIGN PATENT DOCUMENTS

CA 2115610 C 5/2000
CN 101371447 A 2/2009
(Continued)

OTHER PUBLICATIONS

ETSI TS 126 445, Codec for Enhanced Voice Services (EVS); Detailed algorithmic description. V15.1.0 (May 2019) Universal Mobile Telecommunications System (UMTS); LTE; (3GPP TS 26.445 version 15.1.0 Release 15).
(Continued)

*Primary Examiner* — Gerald Gauthier
(74) *Attorney, Agent, or Firm* — Perkins Cole LLP; Michael A. Glenn

(57) ABSTRACT

A multi-channel audio encoder for providing an encoded audio representation on the basis of an input audio representation is provided. The multi-channel audio encoder is configured to switch between a parametric multi-channel encoding of a plurality of channels and an individual encoding of a plurality of channels in dependence on characteristics of the input audio representation.

39 Claims, 8 Drawing Sheets

(58) Field of Classification Search
CPC ... G10L 19/018; G10L 19/032; G10L 19/035; G10L 19/167; G10L 19/18; G10L 21/038; G10L 21/04; G11B 20/00007; G11B 20/10046; H04N 21/23614; H04S 3/00; H04S 3/008; H04S 7/00
See application file for complete search history.

(56) References Cited

U.S. PATENT DOCUMENTS 6,714,825 B1 * 3/2004 Tanaka ............. G11B 20/10046 386/339
7,966,191 B2 6/2011 Schuijers et al.
7,983,922 B2 * 7/2011 Neusinger ............... H04S 3/008 381/23
8,041,041 B1 * 10/2011 Luo ......................... H04S 3/008 381/23
2002/0009000 A1 * 1/2002 Goldberg ......... G11B 20/00007
2002/0067834 A1 * 6/2002 Shirayanagi .......... G10L 19/008 381/20
2003/0014136 A1 * 1/2003 Wang .................... G10L 19/008 381/23
2005/0080622 A1 * 4/2005 Dieterich ......... H04N 21/23614 704/229
2005/0195981 A1 * 9/2005 Faller ........................ H04S 3/00 381/23
2005/0226426 A1 * 10/2005 Oomen ................. G10L 19/008 381/23
2006/0140412 A1 * 6/2006 Villemoes ............. G10L 19/008 381/12
2006/0233380 A1 * 10/2006 Holzer .................. G10L 19/008 381/23
2007/0140499 A1 * 6/2007 Davis .................... G10L 19/018 381/23
2007/0225842 A1 * 9/2007 Smith ....................... H04S 3/00 369/14
2007/0280485 A1 * 12/2007 Villemoes ............. G10L 19/008 381/23
2008/0114606 A1 * 5/2008 Ojala .................... G10L 19/008 704/E21.017
2008/0201153 A1 8/2008 Breebaart et al.
2010/0322429 A1 * 12/2010 Norvell ................. G10L 19/008 381/23
2011/0002470 A1 * 1/2011 Purnhagen ............ G10L 19/167 381/23
2011/0051938 A1 * 3/2011 Moon ................... G10L 19/008 381/23
2011/0085671 A1 * 4/2011 Gibbs ................... G10L 19/008 381/23
2011/0200198 A1 * 8/2011 Grill ....................... G10L 19/18 381/23
2011/0211703 A1 * 9/2011 Villemoes ............. G10L 19/008 381/23
2012/0070007 A1 * 3/2012 Kim ...................... G10L 21/038 381/23
2012/0082316 A1 * 4/2012 Thumpudi ............ G10L 19/008 381/23
2012/0243692 A1 * 9/2012 Ramamoorthy ...... G10L 19/008 381/22
2012/0265541 A1 10/2012 Geiger et al.
2012/0314875 A1 * 12/2012 Lee ....................... G10L 19/008 381/23
2013/0077793 A1 * 3/2013 Moon ................... G10L 19/008 381/23
2013/0230176 A1 * 9/2013 Virette .................. G10L 19/008 381/23
2013/0332148 A1 * 12/2013 Ravelli ................. G10L 19/005 704/203
2013/0332177 A1 * 12/2013 Helmrich ............ G10L 19/0212 704/500
2014/0098963 A1 * 4/2014 Lang ..................... G10L 19/008 381/23
2014/0112481 A1 * 4/2014 Li ......................... G10L 19/008 381/23
2014/0140516 A1 * 5/2014 Taleb ...................... G10L 21/04 381/23
2014/0188488 A1 * 7/2014 Schug .................. G10L 19/173 704/500
2014/0355767 A1 * 12/2014 Virette .................. G10L 19/008 381/23
2015/0010155 A1 * 1/2015 Virette .................. G10L 19/008 381/23
2015/0131800 A1 * 5/2015 Mundt .................. G10L 19/032 381/23
2015/0131801 A1 * 5/2015 Neusinger ............. G10L 19/008 381/23
2015/0187361 A1 * 7/2015 Purnhagen .............. H04S 3/008 381/23
2015/0213790 A1 7/2015 Oh
2015/0213807 A1 * 7/2015 Breebaart ............. G10L 19/008 381/23
2016/0005407 A1 * 1/2016 Friedrich ................ H04S 3/008 381/23
2016/0111100 A1 * 4/2016 Ramo .................. G10L 19/005 381/23
2016/0140974 A1 * 5/2016 Valero .................. G10L 19/035 381/23
2016/0157039 A1 * 6/2016 Disch .................... G10L 19/008 381/23
2016/0198279 A1 * 7/2016 Briand ...................... H04S 7/00 381/23
2017/0365264 A1 12/2017 Disch et al.
2018/0277126 A1 9/2018 Vaillancourt et al.
2020/0168232 A1 5/2020 Nagisetty et al.
2022/0108706 A1 * 4/2022 Ravelli ................. G10L 19/008
2023/0306975 A1 * 9/2023 Fuchs ................... G10L 19/012

FOREIGN PATENT DOCUMENTS

| | | | |
|---|---|---|---|
| CN | 102301744 | A | 12/2011 |
| EP | 3067886 | A1 | 9/2016 |
| JP | H06252863 | A | 9/1994 |
| JP | 2012516471 | A | 7/2012 |
| KR | 20120063527 | A | 6/2012 |
| RU | 2461078 | C2 | 9/2012 |
| TW | 201637000 | A | 10/2016 |
| TW | 1634548 | | 9/2018 |
| WO | 2007087117 | A1 | 8/2007 |
| WO | 2010088132 | A1 | 8/2010 |
| WO | 2010105926 | A2 | 9/2010 |
| WO | 2016142336 | A1 | 9/2016 |
| WO | 2017125558 | A1 | 7/2017 |
| WO | 2017125562 | A1 | 7/2017 |
| WO | 2018221138 | A1 | 12/2018 |
| WO | 2019058927 | A1 | 3/2019 |

OTHER PUBLICATIONS

M. Schroeder and B. Atal, “Code-excited linear prediction(CELP): High-quality speech at very low bit rates,” in ICASSP 85. IEEE International Conference on Acoustics, Speech, and Signal Processing, Tampa, FL, USA, 1985.
Bertrand Fatus. Parametric Coding for Spatial Audio. Master’s Thesis, KTH, Stockholm, Sweden. Dec. 2015—70 pages.
Christof Faller. Parametric coding of spatial audio. PhD Thesis. Ecole Polytechnique Federale De Lausanne. 2004—180 pages.
ISO/IEC DIS 23008-3. Information technology—High efficiency coding and media delivery in heterogeneous environments—Part 3: 3D audio. ISO/IEC JTC 1/SC 29/WG 11. Aug. 5, 2014—435 pages.

* cited by examiner

MULTI-CHANNEL AUDIO ENCODER, DECODER, METHODS AND COMPUTER PROGRAM FOR SWITCHING BETWEEN A PARAMETRIC MULTI-CHANNEL OPERATION AND AN INDIVIDUAL CHANNEL OPERATION

CROSS-REFERENCES TO RELATED APPLICATIONS

This application is a continuation of copending International Application No. PCT/EP2020/059464, filed Apr. 2, 2020, which is incorporated herein by reference in its entirety, and additionally claims priority from European Application No. EP 19 167 449.8, filed Apr. 4, 2019, which is incorporated herein by reference in its entirety.

The present application relates to multi-channel audio encoding and decoding for stereo, two-channel or more than two channel applications. More specifically, it relates to general audio encoding/decoding or speech encoding/decoding or encoding/decoding using a transform domain encoding/decoding with scaling factors and/or a linear-prediction-coefficient-based encoding/decoding.

BACKGROUND OF THE INVENTION

For the transmission of stereo speech signals captured with a microphone arrangement with two or more microphones with a certain distance between the microphones, when low bitrate may be used, parametric stereo techniques may be used. An exemplary parametric stereo technique is described in [1]. For the cases where two or more talkers are present around the microphone arrangement and more than one talker is talking simultaneously during the same time period, a parametric stereo system may perform adequately for most situations. However, there are some cases, where the parametric model may fail to reproduce the stereo image and deliver speech intelligible output for interfering talker scenarios. That happens, for example, when each of the two or more talkers are captured with a different ITD (Inter-channel Time Difference), the ITD values are large (large distance between the microphones) and/or the talkers are sitting in opposite positions around the microphone arrangement axis.

Further, in a parametric stereo scheme like described in [1], some parameters are extracted to reproduce the spatial stereo scene and the stereo signal is deduced to a single-channel downmix that is further coded. In the case of interfering talkers, the downmix signal may be coded with a speech coder such as CELP described in [2]. However, such coding schemes are source-filter models of speech production, designed to represent single talker speech. For interfering talkers, it may be that the core coding model is being violated and perceptual quality is degraded.

SUMMARY

An embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation.

Another embodiment may have a multi-channel audio decoder for providing a decoded audio representation on the basis of an encoded audio representation, wherein the multi-channel audio decoder is configured to switch between a parametric multi-channel decoding of a plurality of channels and an individual decoding of a plurality of channels.

According to another embodiment, an encoded multi-channel audio representation may have: an encoded parametric multi-channel representation of a plurality of channels; and an encoded individual representation of a plurality of channels.

According to another embodiment, a method of multi-channel audio encoding for providing an encoded audio representation on the basis of an input audio representation may have the step of: switching between a parametric multi-channel encoding of a plurality of channels and an individual encoding of a plurality of channels in dependence on characteristics of the input audio representation.

According to another embodiment, a method of multi-channel audio decoding for providing a decoded audio representation on the basis of an encoded audio representation may have the step of: switching between a parametric multi-channel decoding of a plurality of channels and an individual decoding of a plurality of channels.

Another embodiment may have a non-transitory digital storage medium having a computer program stored thereon to perform the method of multi-channel audio encoding for providing an encoded audio representation on the basis of an input audio representation, the method having the step of: switching between a parametric multi-channel encoding of a plurality of channels and an individual encoding of a plurality of channels in dependence on characteristics of the input audio representation, when said computer program is run by a computer.

Another embodiment may have a non-transitory digital storage medium having a computer program stored thereon to perform the method of multi-channel audio decoding for providing a decoded audio representation on the basis of an encoded audio representation, the method having the step of: switching between a parametric multi-channel decoding of a plurality of channels and an individual decoding of a plurality of channels, when said computer program is run by a computer.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether there is a single dominant source in a plurality of time-frequency portions, or whether there are two or more sources in a given time frequency portion, multi-channel encoding parameters of which differ at least by a predetermined deviation or by more than a predetermined deviation, and to switch in dependence on the determination whether the multi-channel encoding parameters differ at least by the predetermined deviation or by more than the predetermined deviation; wherein the multi-channel encoding parameters are based on a relationship between channels of the input audio representation; and wherein the multi-channel audio encoder is configured to switch to the parametric multi-channel encoding in the case of a single source.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether a characteristic defining a relationship between channels of the input audio representation includes only a single significant value, which fulfils a significance condition, or whether the characteristic defining the relationship between channels of the input audio representation includes two or more significant values which fulfil the significance condition and to switch in dependence on the determination.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether there are two or more values describing a relationship between two or more channels of the input audio representation, which fulfill a significance condition and which are associated with a single time-frequency portion and to switch in dependence on the determination.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether there are two or more peaks in a cross-correlation between two or more channels of the input audio representation, and to switch in dependence on the determination, wherein the cross-correlation relates to a given time-frequency portion.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder includes an estimator configured to estimate a relationship between two or more channels of the input audio representation based on a cross-correlation, and the multi-channel encoder is configured to determine whether a difference between two peak values associated with different cross-correlation lag is greater than a value and to switch in dependence on the determination.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether a distance between two or more values describing a relationship between two or more channels of the input audio representation, which fulfill a significance condition and which are associated with a same time-frequency portion, is greater than a value and to switch in dependence on the determination.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether a main peak and one or more subordinate peaks fulfill a significance condition and switch in dependence on the determination, and/or wherein the multi-channel encoder is configured to determine whether there are one or more subordinate peaks of the cross correlation which fulfil a relevance criterion and to switch in dependence on the determination.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether one or more characteristic values, which describe a relationship between two or more channels of the input audio representation fulfill a stability condition and switch in dependence on the determination.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to determine whether a noise condition is fulfilled for a number of frames and to selectively avoid switching if the noise condition is fulfilled.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to selectively avoid a switching at or after a first frame after an inactive frame of the input audio representation, and/or the multi-channel encoder is configured to determine whether a given flag in a frame has changed relative to one or more previous frames and to selectively avoid switching in dependence on the determination.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured to selectively switch to the individual encoding in response to a detection of a change of a characteristic of the input audio representation which is larger than a threshold; wherein the characteristic of the input audio representation is an inter-channel time difference or a main peak of a cross-correlation between two or more channels of the input audio representation.

Another embodiment may have a multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation; wherein the multi-channel encoder is configured determine whether a parameter describing a direction of a sound source in the input audio representation has changed by at least a value and to switch in dependence on the determination.

A multi-channel audio encoder is provided. The multi-channel audio encoder may be a stereo, or a two-channel or a more than two channel audio encoder. The audio encoder may be a general audio encoder, or a speech encoder, or an encoder switching between a transform domain encoding using scaling factors and a linear-prediction-coefficient based encoding. The encoder is configured for providing an encoded audio representation on the basis of an input audio representation. The encoder is configured to switch between a parametric multi-channel encoding of a plurality of channels, for example, channels of the input audio representation, and an individual encoding of a plurality of channels, for example, channels of the input audio representation, in dependence on characteristics of the input audio representation.

The parametric multi-channel encoding may encode a combination signal combining a plurality of channel signals and encode a relationship between two or more channels in the form of parameters. The parameters may comprise inter-channel time difference parameters, and/or inter-channel level difference parameters, and/or inter-channel phase parameters and/or inter-channel correlation parameters.

Switching between the parametric multi-channel encoding and the individual encoding in dependence on characteristics of the input audio representation advantageously allows for adapting the encoding to the characteristics of the input audio representation. Selective switching between the parametric multi-channel encoding and the individual encoding may result in selecting an encoding being more suitable to encode the underlying input audio representation such that the resulting an encoded audio representation may have advantageous properties with regard to, for example, perceived performance.

In other words, the present invention involves a tradeoff between an effort to obtain the characteristics of the input audio representation followed by acting (e.g., switching) upon the characteristics and a benefit of encoding the input audio representation by using an encoding which may be advantageous for a certain input audio representation (or a portion thereof) in terms of, for example, a performance criterion.

According to an embodiment, the multi-channel encoder may be configured to determine whether the input audio representation fulfills an assumption of a model underlying the parametric multi-channel encoding and to switch in dependence on the determination. The assumption may comprise a presence of a single-speaker, for example, a presence of a single significant Inter-channel Time Difference/Interaural Time Difference (ITD) in each time-frequency portion. For example, the characteristics of the input audio representation may provide indications that two or more talkers interfere and hence assumptions of the model underlying the parametric multi-channel encoding with regard to a single speaker may be violated.

According to an embodiment, the multi-channel encoder may be configured to switch to the individual encoding if the assumption of the model underlying the parametric multi-channel encoding is not fulfilled. For example, the assumption with regard to a number of speakers and their ITD/ITDs of the model underlying the parametric multi-channel encoding may not be fulfilled for some input audio representations. However, the assumption of the model underlying the individual encoding may be fulfilled. As a result, switching to the individual encoding may result in an advantageous performance.

According to an embodiment, the multi-channel encoder may be configured to determine whether the input audio representation corresponds to a dominant source, for example, a single dominant source. In such a case, other sources (e.g., all other sources) may be weaker, for example, at least by a predetermined intensity difference. The encoder may be configured to switch in dependence on the determination. A presence or absence of a dominant source may provide an indication with regard to whether the parametric encoding or the individual encoding may be advantageous in terms of performance.

According to an embodiment, the multi-channel encoder may be configured to determine whether there is a single dominant source in a plurality of time-frequency portions and/or to determine whether there are two or more sources in a given time-frequency portion, multi-channel encoding parameters of which differ at least by a predetermined deviation or by more than a predetermined deviation. The multi-channel encoder may be configured to switch in dependence on the determination. The plurality of the time-frequency portions may alternatively comprise all time-frequency portions. The two or more sources may fulfill a significance condition of a source, for example, being relevant and/or significant and/or noticeable sources that are of different positions. The multi-channel encoding parameters may be ITDs. Determining a single source may allow to select an encoding the underlying model of which is suitable for handling a single source, for example, the parametric encoding. Determining a single source in a time-frequency portion or portions may allow to select an encoding for the portion or portions for which the assumptions of the model underlying the encoding are fulfilled, e.g., the parametric model. Determining two or more sources in a given time-frequency portion may indicate that an encoding having an underlying model based on a single source may not provide desired performance for the given time-frequency portion and hence switching the encoding for the given portion may result in advantageous performance. Determining whether the multi-channel parameters differ at least by a predetermined deviation (or by more than a predetermined deviation) may allow determining whether the two or more sources may result in assumptions of the model underlying an encoding to be violated and hence may be an indication to switch to a different encoding.

In an embodiment, the multi-channel encoder may be configured to determine a parameter of a model underlying the parametric multi-channel encoding and to switch in dependence on the parameter of the model. For example, the parameter of the model may be the inter-channel time difference, interaural time difference, ITD. The parameter may describe a relationship between two or more channels of the input audio representation. Determining the parameter of the model underlying the parametric multi-channel encoding may allow for assessing the capability of the parametric model to deliver desired performance for a given relationship between the two or more channels of the input audio representation and for performing switching in order to achieve advantageous performance.

In an embodiment, the multi-channel encoder may be configured to determine whether a characteristic defining a relationship between channels of the input audio representation allows for an unambiguous determination of a multi-channel encoding parameter or indicates two or more different possible values of the multi-channel encoding parameter and to switch in dependence on the determination. For example, the characteristic defining a relationship between the channels may be an evolution of a generalized cross-correlation phase transform (GCC-PHAT) over a lag parameter, or an evolution of a cross-correlation function between two or more channels over a lag parameter. The multi-channel encoding parameter may be the ITD. The two or more different possible (e.g., meaningful) values may differ at least by a predetermined value, and may be distinguishable from a noise floor. The characteristic may comprise two or more values (e.g., peak values, or values fulfilling a significance condition) which differ at most by a (e.g., predetermined or signal-adaptive) difference (e.g., a value) with respect to their significance, or only a single value fulfilling the significance condition. Determining the relationship between channels of the input audio representation by using an evolution of a generalized cross-correlation phase transform or an evolution of a cross-correlation function may allow for quantifying the relationship between the channels to obtain the characteristic. Determining whether two or more different values of the multi-channel encoding parameter differ at least by a predetermined value and whether the two or more different values of the multi-channel encoding parameter are distinguishable from the noise floor allows for advantageously reliable determining whether an unambiguous determination of a multi-channel encoding parameter is possible or whether two or more different meaningful values of the multi-channel encoding parameter may be determined. Alternatively or in addition, determining whether the characteristic comprises two or more values which differ at most by a difference with respect to their significance determined, for example, by using a significance condition, allows for advantageously reliable determining whether an unambiguous determination of a multi-channel encoding parameter is possible or whether two or more different meaningful values of the multi-channel encoding parameter may be determined.

In an embodiment, the multi-channel encoder may be configured to determine whether a characteristic defining a relationship between channels of the input audio representation comprises only a single significant value, which fulfill a significance condition, or whether the characteristic defining the relationship between channels of the input audio representation comprises two or more (e.g., different) significant values, which fulfill the significance condition and to switch, for example, between the parametric multi-channel encoding and the individual encoding of a plurality of channels, in dependence on the determination. The characteristic defining the relationship between the channels may be an evolution of a GCC-PHAT over a lag parameter, or an evolution of a cross-correlation function between two or more channels over a lag. The single significant value may involve a single significant peak, which represents a single ITD value. The significance condition may comprise a magnitude relationship between two or more local peaks or maxima and/or a distance relationship between the two local peaks or maxima, and/or a distance from a noise floor. The significance condition may be predetermined or be signal-adaptive, for example, may be based on the characteristics of the input audio representation. The two or more significant values may comprise at least two significant peaks, which represent two or more different ITD values. The fulfillment of the significance condition may be determined in a single time-frequency portion. Determining the relationship between the channels of the input audio representation by using an evolution of a GCC-PHAT or a cross-correlation function may advantageously allow for quantifying the relationship between the channels to obtain the characteristic. Determining whether the characteristic comprises only a single significant value or whether the characteristic comprises two or more values may advantageously allow for determining which of encoding, e.g., the parametric multi-channel encoding or the individual encoding, may be more suitable for the given input audio representation. The significance condition may advantageously allow for using one or more criteria for evaluating the values, for example, the magnitudes between two local peaks or maxima, the distances between two local peaks or maxima, e.g., in the time-domain such as a time lag or in the frequency-domain, and/or a distance from a noise floor, in order to determine which of the values comprised on the evolution may be taken into account in determining whether the characteristics comprises only a single significant value or two or more significant values.

In an embodiment, the multi-channel encoder may be configured to determine a parameter of a previous frame, e.g., of an encoded audio representation, and to switch in dependence on the parameter of the previous frame. The parameter of the previous frame may be a SAD flag. Determining the parameter of the previous frame may be advantageously used, for example, to determine whether the previous frame comprises an active signal such that switching at the first frame of a signal portion may be selectively avoided.

In an embodiment, the multi-channel encoder may be configured to determine whether there are interfering sources in the input audio representation and to switch in dependence on the determining. The interfering source may comprise two or more interfering sound sources, or two or more interfering speakers, or two or more interfering talkers. The interfering sources (or speakers, or talkers) in the input audio representation may be determined, for example, in a time-frequency portion or, for example, in an overlapping time-frequency resource or portion. Determining whether there are interfering sources may advantageously allow to switch between the parametric multi-channel encoding and the individual encoding, for example, based on the determination that the input audio representation comprises interfering sources which may result in performance degradation, for example, of the parametric multi-channel encoding and, for example, in advantageous performance of the individual encoding.

In an embodiment, the multi-channel encoder may be configured to determine whether there are two or more values describing a relationship between two or more channels of the input audio representation, which fulfill a significance condition and which are associated with a single time-frequency portion and to switch in dependence on the determination. The two or more values may comprise relevant values, or significant values. Determining whether there are two or more values which fulfil a significance condition and are associated with a single time-frequency portion may advantageously allow for determining that, for instance, the input audio representation may result in performance degradation, for example, of the parametric multichannel encoding and, for example, in advantageous performance of the individual encoding.

In an embodiment, the multi-channel encoder may be configured to determine whether there are two or more peaks in a cross-correlation, e.g., a GCC-PHAT, between two or more channels of the input audio representation and to switch in dependence on the determination. The cross correlation may relate to a given time-frequency portion. Determining whether there are two or more peaks in the cross-correlation between two or more channels may advantageously allow to quantitatively determine whether there may be interfering talkers in the input audio representation which may degrade performance of, for example, the parametric multi-channel encoding and to switch, for example, to the individual encoding upon the determination.

In an embodiment, the multi-channel encoder may comprise an estimator configured to estimate a relationship between two or more channels of the input audio representation based on a cross-correlation. The estimator may be configured to estimate the relationship individually for a plurality of time-frequency portions. The estimator may be an ITD estimator. The cross-correlation may be a GCC-PHAT, or a smoothed cross-correlation. The cross-correlation may be performed in a time-domain or may be performed in a frequency-domain. The multi-channel encoder may be further configured to determine whether a difference between two peak values, e.g., relevant and/or significant values, as, for example, estimated by the estimator, associated with different cross-correlation lag is greater than a value (e.g., a predetermined value or a signal-adaptive value) and to switch in dependence on the determination. An estimator, for example, an ITD estimator may be present in an encoder, for example, an encoder using a parametric multi-channel encoding, and hence using the estimator to determine whether the difference between two peak values associated with different cross-correlation lag is greater that a threshold may not introduce substantial additional complexity.

In an embodiment, the multi-channel encoder may be configured to determine whether a distance between two or more values (e.g., relevant values, or significant values) describing a relationship between two or more channels of the input audio representation, which fulfill a significance condition and which are associated with a same time-frequency portion, is greater than a value (e.g., a predetermined value, or a signal-adaptive value) and to switch in dependence on the determination. The distance may be determined with respect to a time lag or a cross-correlation lag, e.g., in a time-domain. The two or more values may be peaks of a cross-correlation between two or more channels of the input audio representation and may be provided by an estimator, e.g., the ITD estimator. The peak values may be values fulfilling a significance condition. Determining whether the distance between the two or more values which fulfil a significance condition and which are associated with the same time-frequency portion is greater than a threshold allows for advantageously discriminating between, for example, two or more peaks located at a small distance which may be possibly attributed to a single source, and two or more peaks located at a significant (e.g. larger) distance which may be attributed to more than a single source.

In an embodiment, the multi-channel encoder may be configured to determine a first characteristic value based on an evolution of a cross-correlation (e.g., over a lag parameter) and to switch based on the determination. The first characteristic value may be a main peak, or a primary peak. The cross-correlation may comprise a GCC-PHAT. The first characteristic value may fulfill a significance condition. The peak value may be a greatest (e.g., absolute) value in the evolution. The determining may comprise evaluation of evolutions for one or more frames including, for example, one or more previous frames. The determining may further comprise determining whether the value fulfills a stability condition. The stability condition may be, for example, fulfilled if the value is within a range (e.g., a predetermined range, or a signal-adaptive range) for a number of previous frames (e.g., a predetermined number of previous frames, or a signal-adaptive number of previous frames). Also, alternatively or in addition, the fulfillment of the stability criterion may be determined based on a hysteresis mechanism having the value for a number of frames (e.g., a predetermined number of previous frames, or a signal-adaptive number of previous frames) as an input. Determining the first characteristic value, for example, the main peak, may allow for advantageously evaluating whether the determined value (which in many cases is the greatest value in the evolution of the cross-correlation), alone or in conjunction with further one or more values, gives rise to switch the encoding between the parametric multi-channel encoding and the individual encoding. Further, taking optionally into account the significance condition and/or the stability condition may advantageously allow for determining whether the switching is to be, for example, selectively avoided if, for instance, the detected value is not sufficiently stable over time and/or not sufficiently far, for instance, from a noise floor.

In an embodiment, the multi-channel encoder may be configured to determine one or more subordinate characteristic values based on the evolution of the cross-correlation and to switch based on the determination. The one or more subordinate characteristic values may be secondary peaks, or second peaks. The subordinate values may be determined based on a portion of the evolution of the cross-correlation. For example, each element of the portion may have a distance (e.g., with respect to a time lag, e.g., in a time-domain) to the first characteristic value which exceeds a (e.g., predetermined or signal-adaptive) threshold. The one or more subordinate characteristic values may fulfill the significance condition. The one or more subordinate characteristic values may be one or more greatest (e.g., absolute) values in the portion of the evolution. The one or more subordinate characteristic values may fulfill the stability condition. Determining the one or more subordinate characteristic values may advantageously allow for evaluating whether the determine values, e.g., the first characteristic value and/or the one or more subordinate characteristic values, give rise to switch the encoding between the parametric multi-channel encoding and the individual encoding. Further, optionally evaluating for the one or more subordinate values in the portion of the evolution of the cross-correlation having a certain distance from the first characteristic value may advantageously allow for reliably attributing the input audio representation to a single source or to multiple sources. Alternatively or in addition, the multi-channel encoder may be configured to determine whether there are one or more subordinate characteristic values based on the evolution of the cross-correlation and to switch in dependence on the determination. In other words, the mere existence of the one or more subordinate characteristic values may be determined, for example, based on, for example, on a pattern recognition algorithm or the like.

In an embodiment, the multi-channel encoder may be configured to determine the main peak and the one or more subordinate peaks fulfill a significance condition and to switch in dependence on the determination. For example, the significance condition is fulfilled if a difference (e.g., a relative difference) between the main peak and the one or more subordinate peaks is greater than a threshold (e.g., a predetermined threshold, or a signal-adaptive threshold) for a number of frames for which the stability condition is fulfilled. The difference between the peaks may be determined, for example, with respect to their amplitudes, or with respect to their phases, or with respect to their time lag. Alternatively or in addition, the multi-channel encoder may be configured to determine whether there are one or more subordinate peaks of the cross-correlation which fulfill a relevance criterion and to switch in dependence on the determination. The relevance criterion may be defined, for example, with respect to the main peak and/or with respect to a noise floor of the cross correlation. Determining a significant difference between the main peak and the one or more subordinate peaks advantageously allows for reliable determining that more than one source is present in the input audio representation and to switch, for example, to the individual encoding based in the determining.

In an embodiment, the multi-channel encoder may be configured to selectively consider a subordinate peak in a given frame of the input audio representation if there have been one or more corresponding subordinate peaks in one or more frames preceding the given frame. For example, the one or more corresponding subordinate peaks may be located at a same auto-correlation lag as the subordinate peak under consideration, or in a predetermined range of auto-correlation lags around the auto-correlation lag of the subordinate peak under consideration. Selectively considering a subordinate peak in a given frame in view of one or more corresponding subordinate peaks in one or more preceding frames advantageously allows for determining whether certain spatial and/or level/phase/frequency stability may be attributed to the source/sources prior to switching the encoding. The stability may encompass one or more frames and hence may relate to the circumstances of the source/sources rather than being bounded by the length of the frame.

In an embodiment, the multi-channel encoder may be configured to determine whether one or more characteristic values, which describe a relationship between two or more channels of the input audio representation fulfill a stability condition and to switch in dependence on the determination. The characteristic values may be the main peak and/or the one or more subordinate peaks. The stability condition may be fulfilled, for example, if the value is within a range (e.g., a predetermined range, or a signal-adaptive range) or is greater than a threshold (e.g., a predetermined threshold or a signal-adaptive threshold) for a number of previous frames (e.g., a predetermined number of previous frames, or a signal-adaptive number of previous frames). Alternatively or in addition, the fulfillment of the stability condition may be determined based on a hysteresis having the value for a number (e.g., a predetermined number of previous frames, or a signal-adaptive number of previous frames) of frames (e.g., previous frames) as an input. Determining the fulfillment of the stability condition may advantageously allow for avoiding switching on noisy input audio representation or portions thereof, for example, on noisy frames.

In an embodiment, the multi-channel encoder may be configured to determine whether a noise condition is fulfilled for a number of frames (e.g., a predetermined number of frames, or a signal-adaptive number of frames) and to selectively avoid switching if the noise condition is fulfilled. The frames may include the present frame. The noise condition may be fulfilled, for example, if a noise characteristic (e.g., a noise floor) of a frame (or a number of frames) is greater than a threshold value (e.g., a predetermined threshold value, or a signal-adaptive threshold value). Determining the fulfillment of the noise condition may advantageously allow for avoiding switching on noisy input audio representation or portions thereof, for example, on noisy frames.

In an embodiment, the multi-channel encoder may be configured to determine whether the significance condition and/or the stability condition for the characteristic value is fulfilled for a number of frames and to switch in dependence on the determination. The characteristic value may be the main peak and/or one or more subordinate peaks. The number of frame may be predetermined or signal-adaptive. The frames may include one or more previous frames and/or the current frame. Determining the fulfillment of the significance condition and/or the stability condition for a number of frames may advantageously allow for selective avoiding switching on unstable signals, for example, unstable and/or noise portions of the input audio representation.

In an embodiment, the multi-channel encoder may be configured to determine whether a distance of the one or more subordinate peaks is in a predetermined range and to switch and/or selectively avoid switching in dependence on the determination. For example, the one or more subordinate peaks may have the greatest value (e.g., the greatest absolute value) and may be referred to as the peak(2). The distance may be determined with respect to a time lag (e.g., an absolute time lag or a relative time lag) and/or may be determined in a time-domain or in a frequency-domain. The distance may be determined for a number of frames (e.g., a predetermined number of frames, or a signal-adaptive number of frames). The frames may include one or more previous frames and/or the present frame. Determining whether the distance of the one or more peaks is in a predetermined range and to switch and/or selectively avoid switching based thereon may advantageously allow for selective avoiding switching on unstable signals, for example, unstable and/or noise portions of the input audio representation.

In an embodiment, the multi-channel encoder may be configured to selectively avoid switching at or after a first frame after an inactive frame of the input audio representation. The inactive frame may comprise a noise frame. Alternatively or in addition, the multi-channel encoder may be configured to determine whether a given flag in a frame has changed relative to one or more previous frames and to selectively avoid switching in dependence on the determination. The flag may, for example, indicate an active signal and may be a SAD flag. The selectively avoid switching may comprise avoiding switching at or after a first frame in which the flag takes an active value. As a result, switching at the first frame of a signal portion may be advantageously selectively avoided.

In an embodiment, the multi-channel encoder may be configured to selectively switch to the individual encoding in response to a detection of a change of a characteristic of the input audio representation which is larger than a threshold (e.g., a predetermined threshold, or a signal-adaptive threshold). The characteristic of the input audio representation may be, for example, an ITD, or a main peak, or a peak(1). Selective switching to the individual encoding in response to detecting a change in the characteristic being larger than a threshold may advantageously allow for acting upon an abrupt change without the necessity to evaluate additional characteristics/parameters.

In an embodiment, the multi-channel encoder may be configured to determine whether a parameter describing a direction of a sound source has changed (e.g., relative to a previous/last frame) by at least a value (e.g., a threshold value) and to switch in dependence on the determination. The parameter may be a location of a main peak in a cross-correlation (e.g., in a GCC-PHAT) in a time-frequency portion. The switching may comprise switching to the individual encoding. Determining whether a parameter describing a direction of a sound source has change by at least a threshold may advantageously allow for switching to a certain encoding, for example, the individual encoding, if the sound source rapidly moves, for example, relative to the microphone or an additional sound source suddenly appears and interferes with an existing sound source in a time-frequency portion.

Further, a multi-channel audio decoder is provided. The multi-channel audio decoder may be a stereo, or a two-channel or a more than two channel audio decoder. The audio decoder may be a general audio decoder, or a speech decoder or a decoder switching between a transform domain decoding using scaling factors and a linear-prediction-coefficient based decoding. The decoder is configured for providing a decoded audio representation on the basis of an encoded audio representation. The decoder is configured to switch between a parametric multi-channel decoding of a plurality of channels, for example, channels of the input audio representation, and an individual decoding of a plurality of channels, for example, channels of the input audio representation.

For the parametric multi-channel decoding a combination signal combining a plurality of channel signals may be encoded and a relationship between two or more channels in the form of parameters may be encoded. The parameters may comprise inter-channel time difference parameters, and/or inter-channel level difference parameters, and/or inter-channel phase parameters and/or inter-channel correlation parameters.

Switching between the parametric multi-channel decoding and the individual decoding advantageously allows for adapting the decoding (and hence also the encoding) to the characteristics of the input audio representation. Selective switching between the parametric multi-channel decoding and the individual decoding may allow for selecting an encoding being more suitable to encode the underlying input audio representation such that the resulting an encoded audio representation may have advantageous properties with regard to, for example, perceived performance.

In other words, the present invention involves a tradeoff between an effort to obtain the characteristics of the input audio representation followed by acting (e.g., switching) upon the characteristics and a benefit of the input audio representation being encoded (and hence available for decoding) by using an encoding which is advantageous for a certain input audio representation (or a portion thereof) in terms, for example, of a performance criterion.

In an embodiment, the multi-channel audio decoder may be configured to switch between the parametric multi-channel decoding and the individual decoding in dependence on a signaling included in the encoded audio representation. The signaling included in the encoded audio representation may simplify the decoder relative to a decoder which infers the underlying encoding scheme based, for example, on the context of the obtained encoded audio representation.

In addition, an encoded multi-channel audio representation is provided. The multi-channel audio representation may be a stereo, or a two-channel or a more than two channel audio representation. The encoded multi-channel audio representation comprises an encoded parametric multi-channel representation of a plurality of channels (e.g., of an input audio representation) and an encoded individual representation of a plurality of channels (e.g., of the input audio representation).

The parametric multi-channel encoding may encode a combination signal combining a plurality of channel signals and encode a relationship between two or more channels in the form of parameters. The parameters may comprise inter-channel time difference parameters, and/or inter-channel level difference parameters, and/or inter-channel phase parameters and/or inter-channel correlation parameters.

In other words, the multi-channel audio representation of the present invention advantageously allows for selectively using an encoding being more suitable to encode the underlying input audio representation such that the resulting an encoded audio representation may have advantageous properties with regard to, for example, perceived performance or any other criterion.

In an embodiment, the encoded multi-channel audio representation may further comprise signaling indicating (e.g., to a decoder) to switch between the parametric multi-channel representation and the individual representation. The signaling may indicate to switch while, for example, decoding the encoded multi-channel audio representation.

Furthermore, a method of multi-channel audio encoding is provided. The multi-channel encoding may comprise a stereo, or a two-channel or a more than two channel audio encoding. The audio encoding may be performed by a general audio encoder, or a speech encoder or an encoder switching between a transform domain encoding using scaling factors and a linear-prediction-coefficient based encoding. The encoding provides an encoded audio representation on the basis of an input audio representation. The method comprises switching between a parametric multi-channel encoding of a plurality of channels, for example, channels of the input audio representation, and an individual encoding of a plurality of channels, for example, channels of the input audio representation, in dependence on characteristics of the input audio representation.

The parametric multi-channel encoding may encode a combination signal combining a plurality of channel signals and encode a relationship between two or more channels in the form of parameters. The parameters may comprise inter-channel time difference parameters, and/or inter-channel level difference parameters, and/or inter-channel phase parameters and/or inter-channel correlation parameters.

Switching between the parametric multi-channel encoding and the individual encoding in dependence on characteristics of the input audio representation advantageously allows for adapting the encoding to the characteristics of the input audio representation. Selective switching between the parametric multi-channel encoding and the individual encoding may result in selecting an encoding being more suitable to encode the underlying input audio representation such that the resulting an encoded audio representation may have advantageous properties with regard to, for example, perceived performance or any other performance criterion.

Further, a method of multi-channel audio decoding is provided. The multi-channel audio decoding may comprise a stereo, or a two-channel or a more than two channel audio decoding. The audio decoding may be performed by a general audio decoder, or a speech decoder or a decoder switching between a transform domain decoding using scaling factors and a linear-prediction-coefficient based decoding. The decoding provides a decoded audio representation on the basis of an encoded audio representation. The method comprises switching between a parametric multi-channel decoding of a plurality of channels, for example, channels of the input audio representation, and an individual decoding of a plurality of channels, for example, channels of the input audio representation.

For the parametric multi-channel decoding a combination signal combining a plurality of channel signals may be encoded and a relationship between two or more channels in the form of parameters may be encoded. The parameters may comprise inter-channel time difference parameters, and/or inter-channel level difference parameters, and/or inter-channel phase parameters and/or inter-channel correlation parameters.

Switching between the parametric multi-channel decoding and the individual decoding advantageously allows for adapting the decoding (and hence also the encoding) to the characteristics of the input audio representation. Selective switching between the parametric multi-channel decoding and the individual decoding may allow for selecting an encoding being more suitable to encode the underlying input audio representation such that the resulting an encoded audio representation may have advantageous properties with regard to, for example, perceived performance.

The method can optionally be supplemented by any of the features, functionalities and details disclosed herein, also with respect to the apparatuses. The method can optionally be supplemented by such features, functionalities and details both individually and taken in combination.

Furthermore, a computer program for performing one of the methods described above, when the computer program runs on a computer, is provided.

Embodiments of the present invention will be discussed below with reference to the accompanying drawings.

BRIEF DESCRIPTION OF THE DRAWINGS

Embodiments of the present invention will be detailed subsequently referring to the appended drawings, in which.

DETAILED DESCRIPTION OF THE INVENTION

1. Audio Encoder According to FIG. 1

Figure 1:
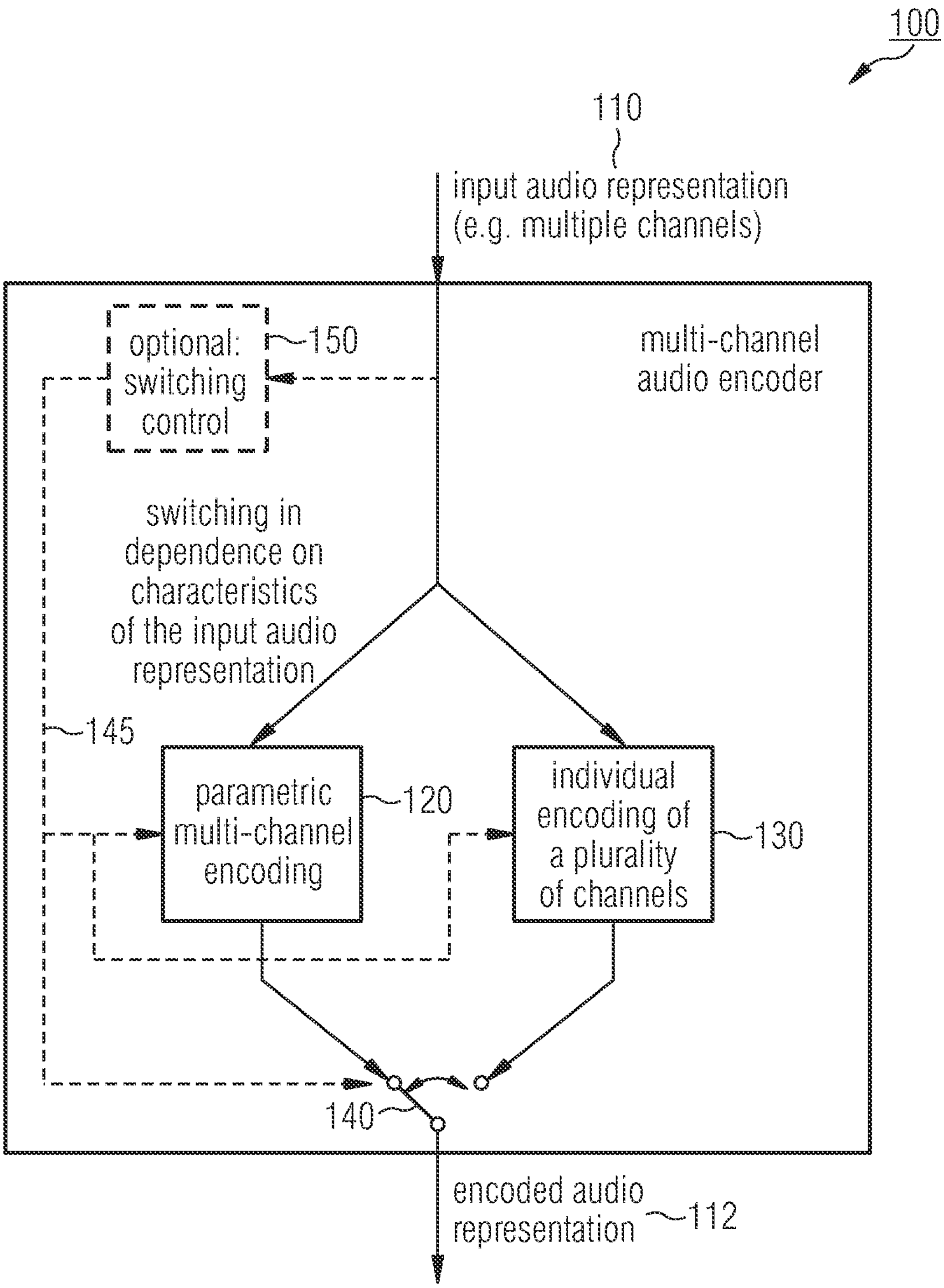
FIG. 1 shows a block schematic diagram of an audio encoder, according to an embodiment.

FIG. 1 shows schematically a multi-channel audio encoder 100. The multi-channel audio encoder 100 is provided with an input audio representation 110 as an input. For example, the input audio representation 110 may comprise multiple channels. The multi-channel audio encoder 100 provides an encoded audio representation 112 as an output.

The multi-channel audio encoder 100 comprises a functional block for performing a parametric multi-channel encoding 120 and a functional block for performing an individual encoding of a plurality of channels 130. The input audio representation 110 is provided to each of the functional blocks 120 and 130. The output of each of the functional blocks 120 and 130 is selectively switched by a switching element 140 such that the encoded audio representation 112 is provided by the multi-channel audio encoder 100.

The multi-channel audio encoder 100 controls the switching element 140 by using a switching control signal 145 in dependence on characteristics of the input audio representation 110. The control signal 145 may be provided by an optional functional block for performing switching control 150 comprised in the multi-channel audio encoder 100 or any other suitable means.

Alternatively or in addition, the switching control signal 145 may be also be provided to any of the functional blocks 120 and 130 such that the blocks 120 and 130 may be selectively disabled (e.g., switched off). For example, the functional block for performing the parametric multi-channel encoding 120 may be disabled based on the switching control signal 145 if the switching control signal 145 indicates that the functional block for performing the individual encoding of the plurality of channels 130 is to be used for encoding the input audio representation 110.

Alternatively, the functional block for performing the individual encoding of the plurality of channels 130 may be disabled based on the switching control signal 145 if the switching control signal 145 indicates that the functional block for performing the parametric multi-channel encoding 120 is to be used for encoding the input audio representation 110.

The audio encoder 100 may optionally be supplemented by any of the features, functionalities and details disclosed herein, both individually and taken in combination.

2. Audio Decoder According to FIG. 2

Figure 2:
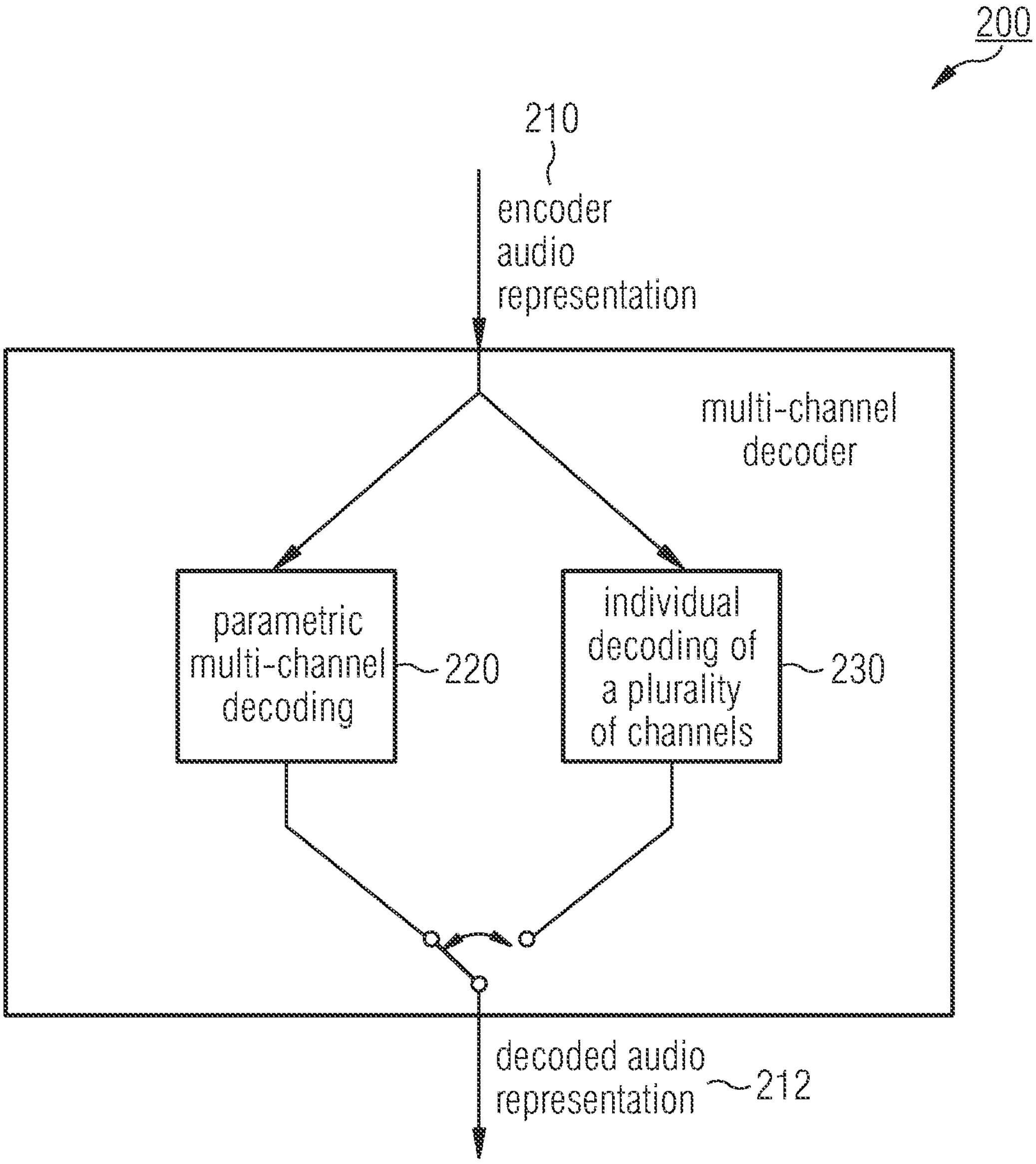
FIG. 2 shows a block schematic diagram of an audio decoder, according to an embodiment.

FIG. 2 shows schematically a multi-channel audio decoder 200. The multi-channel audio decoder 200 is provided with an encoded audio representation 210 as an input. The multi-channel audio decoder 200 provides a decoded audio representation 212. For example, the decoded audio representation 212 may comprise multiple channels.

The multi-channel decoder 200 comprises a functional block for performing a parametric multi-channel decoding 220 and a functional block for performing an individual decoding of a plurality of channels 230. The encoded audio representation 210 is provided to each of the functional blocks 220 and 230. The output of each of the functional blocks 220 and 230 is selectively switched by a switching element 240 such that the decoded audio representation 212 is provided by the multi-channel audio decoder 200.

The switching element 240 is controller, for example, by an implicit or explicit signaling (not shown) comprised in the encoded audio representation 210.

The audio decoder 200 may optionally be supplemented by any of the features, functionalities and details disclosed herein, both individually and taken in combination.

3. Method for Providing an Encoded Audio Representation, According to FIG. 3

Figure 3:
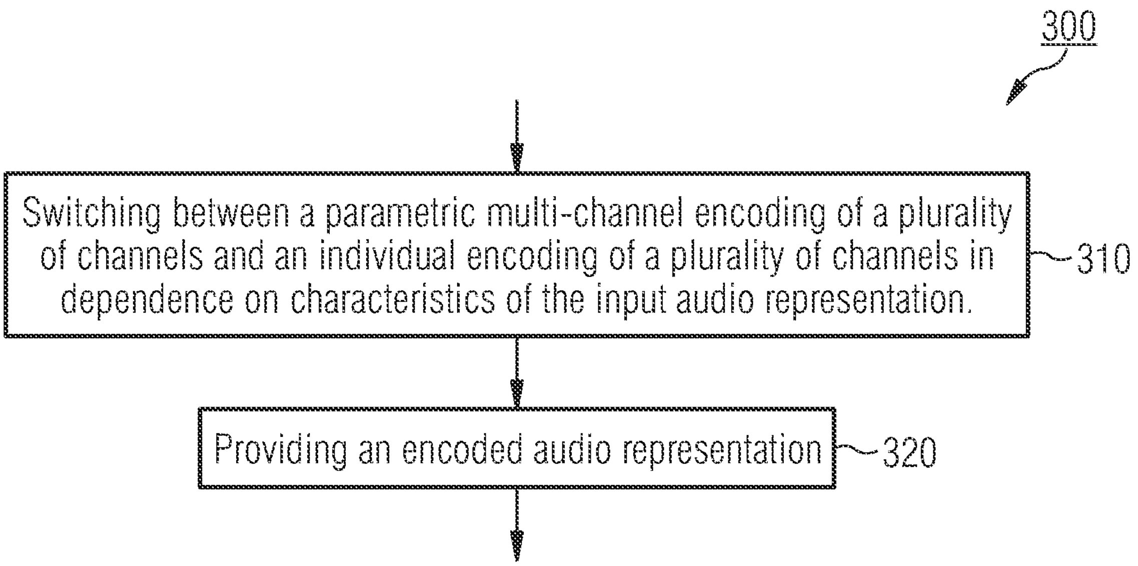
FIG. 3 shows a flow chart of a method for providing an encoded audio representation, according to an embodiment.

FIG. 3 shows schematically a method 300 of multi-channel audio encoding. The method 300 comprises the step 310 of switching between a parametric multi-channel encoding of a plurality of channels and an individual encoding of a plurality of channels in dependence on characteristics of the input audio representation. In addition, the method 300 comprises the step 320 in which an encoded audio representation is provided.

It is noted that the method 300 may optionally perform further suitable activities which are disclosed in conjunction with any of apparatus, for example, the multi-channel encoder according to the present invention.

4. Method for Providing an Encoded Audio Representation, According to FIG. 4

Figure 4:
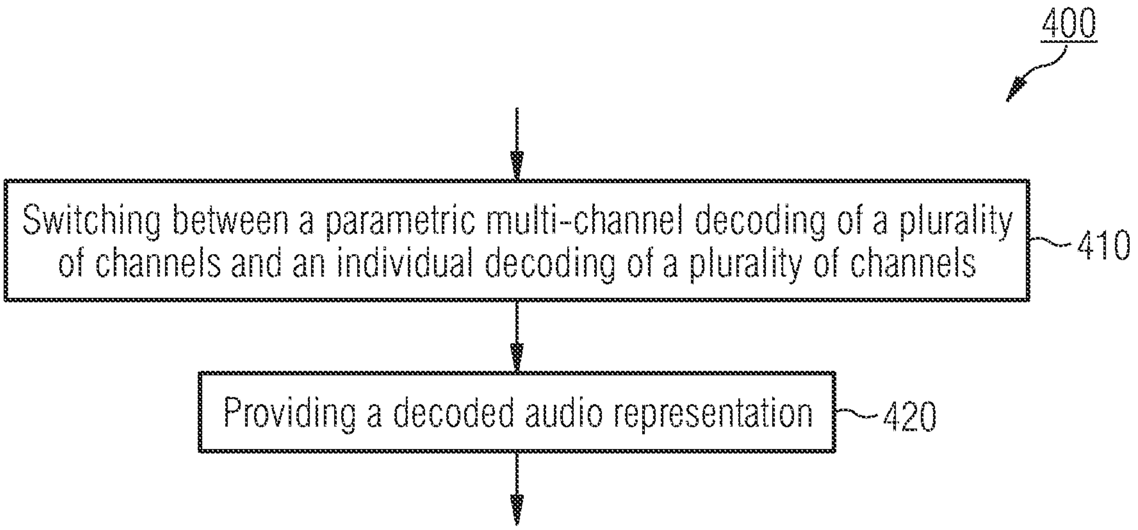
FIG. 4 shows a flow chart of a method for providing a decoded audio representation, according to an embodiment.

FIG. 4 shows schematically a method 400 of multi-channel audio decoding. The method 400 comprises the step 410 of switching between a parametric multi-channel decoding of a plurality of channels and an individual decoding of a plurality of channels. In addition, the method 400 comprises the step 420 in which a decoded audio representation is provided.

It is noted that the method 400 may optionally perform further suitable activities which are disclosed in conjunction with any apparatus, for example, the multi-channel decoder according to the present invention.

5. Audio Encoder According to FIG. 5

Figure 5:
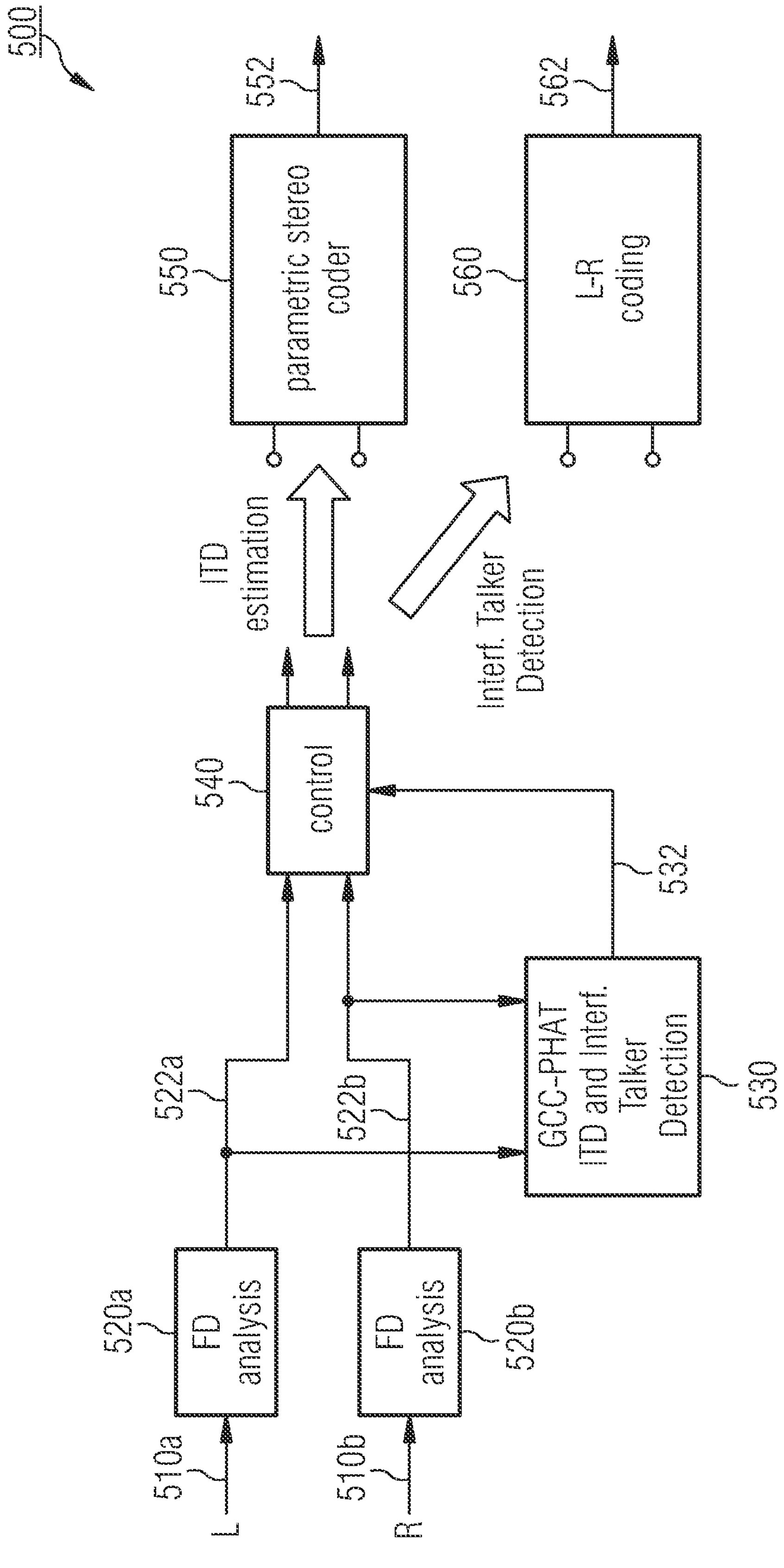
FIG. 5 shows a block schematic diagram of an audio encoder, according to an embodiment.

FIG. 5 shows schematically an embodiment of a multi-channel audio encoder 500. The multi-channel audio encoder 500 is provided with two input audio representation signals, i.e., an audio representation signal 510*a*, which corresponds to a left channel and is designated by L, and an audio representation signal 510*b*, which corresponds to a right channel and is designated by R.

Each of the input audio representation signals 510*a* and 510*b* undergoes an optional frequency domain analysis in the functional blocks 520*a* and 520*b*, respectively. Each of the functional blocks 520*a* and 520*b* obtains a signal in the time-domain, i.e., a signal evolution over time, and provides information about the signal with respect to the amplitude and/or the phase of the signal in a given frequency band over a range of frequencies. The functional blocks 520*a* and 520*b* provide the output signals 522*a* and 522*b*, respectively. Alternatively, the functional blocks 520*a* and 520*b* may not be present and the signal 522*a* may equate to the signal 510*a*, and the signal 522*b* may equate to the signal 510*b*.

The signals 522*a* and 522*b* are provided to the functional block 530. The block 530 performs a cross-correlation operation on the signals 530 and provides a detection signal 532 indicating whether an interfering talker is detected in the input audio representation signals 510*a* and 510*b*. More specifically, the block 530 performs a generalized cross-correlation phase transform, which is also referred to as GCC-PHAT, on the signals 522*a* and 522*b*. The GCC-PHAT performs a cross-correlation operation employing a weighting function that normalizes the signal spectral density in order to obtain peaks which are advantageously distinguishable relative, for example, to the noise floor. The GCC-PHAT provides a value indicating a measure of similarity of its input signals having a time lag between these two signals as a parameter. As a result, by analyzing the peaks in the result of the GCC-PHAT operation, the block 530 determines the inter-channel time difference, which is also referred to as the interaural time difference or ITD, and concludes whether an interfering talker is present in the audio representation signals 510*a* and 510*b*. In order to determine whether the interfering talker is present in the signals 510*a* and 510*b*, the block 530 may optionally use a significance condition, a stability condition and/or a noise condition discussed in conjunction with other embodiments of the present invention. The signal 532 may further comprise an estimation of the ITD.

The signal 532 is provided to a controller 540. The controller 540 also obtains signals 522*a* and 522*b* as inputs. The controller selectively provides the signals 522*a*, 522*b* and the estimation of the ITD to a parametric stereo coder 550 (i.e., a functional block for a parametric multi-channel encoding) or to the L-R coding block 560 (i.e., a functional block for encoding of individual channels) in dependence of the detection signal provided by the block 530. More specifically, the controller 540 provides the ITD estimation and the signals 522*a* and 522*b* to the parametric stereo coder 550 in response to obtaining an indication that an interfering talker is not present in the signals 510*a* and 510*b*. In response thereto, the coder 550 provides an encoded audio representation 552 according to the parametric multi-channel encoding as an output of the multi-channel audio encoder 500. Alternatively, in response to obtaining an indication that an interfering talker is present in the signals 510*a* and 510*b*, the controller 540 provides the signals 522*a* and 522*b* to the L-R coding block 560. In response thereto, the coding block 560 provides an encoded audio representation 562 according to the individual encoding (e.g., left-right, L-R coding).

The parametric stereo coder 550 may be implement the encoding as described in [1] or [2]. It is understood that an appropriate standard (or more a set of rules) defining a parametric stereo coding, for example, in MPEG-4 standard Part 3 or HE-AAC v2 may be used by the coder 550. The coding block 560 may implement the encoder as described in [4]. It is understood that an appropriate standard (or a set of rules) defining an individual encoding of a plurality of channels may be used by the coding block 560. The coding block 560 may also implement joint stereo coding, M/S stereo coding or the like.

Figure 6:
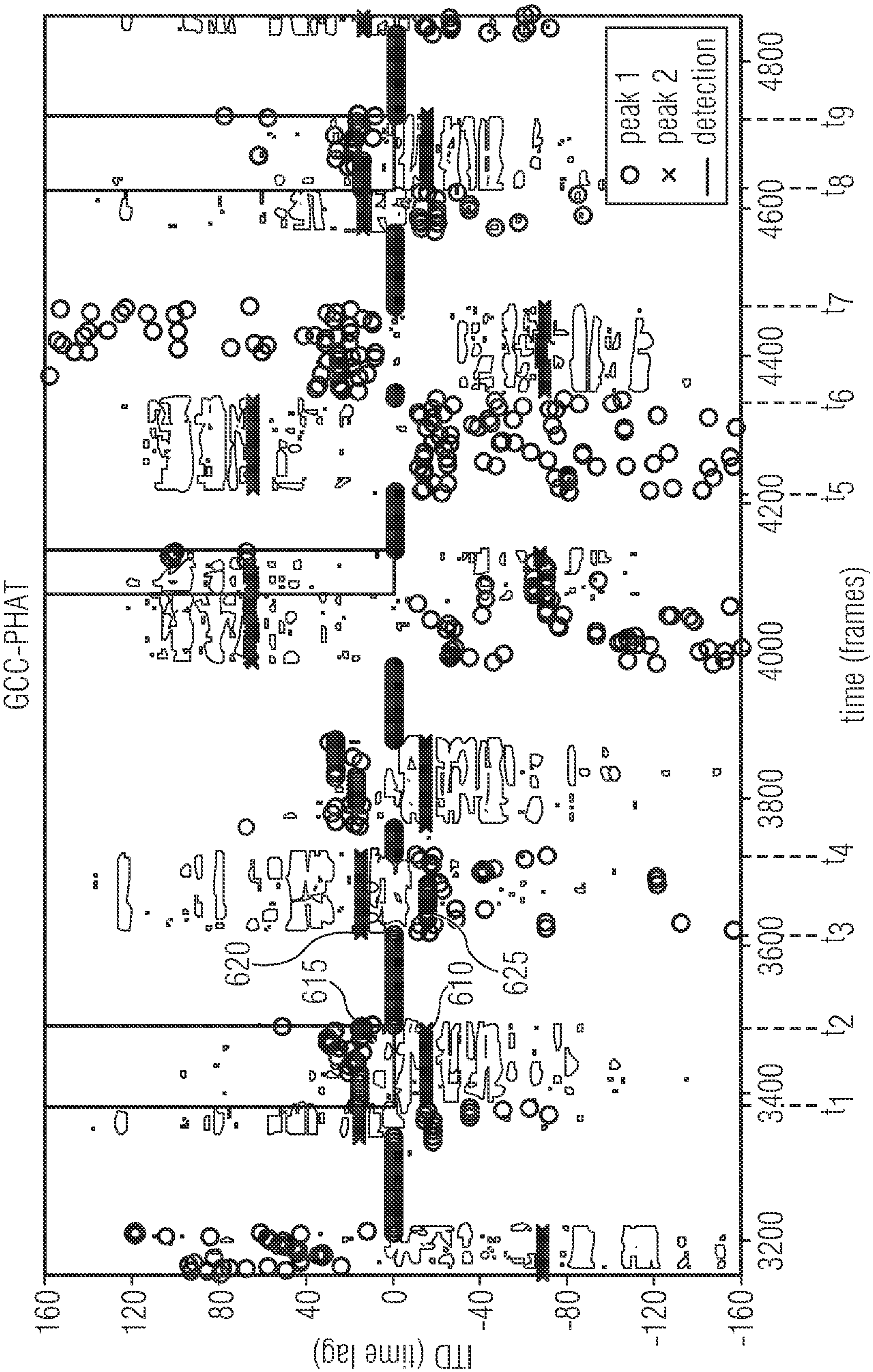
FIG. 6 shows a representation of an audio signal and of correlation peaks.

FIG. 6 visualizes an exemplary operation of a GCC-PHAT functional unit, for example, as comprised in the block 530 discussed in conjunction with FIG. 5 above. More specifically, FIG. 6 is a two dimensional presentation of the values of the GCC-PHAT and their analysis in terms of determining one or more peak values and detecting an interfering talker based thereon. The abscissa of the presentation shown in FIG. 6 relates to progressing of time which is expressed in the unit of frames. For the purpose of the following explanations, different time ranges are defined by identifying exemplary time points, such as $t_1$, $t_2$, etc., being the end points of the respective ranges. The ordinate of the presentation shown in FIG. 5 relates to the parameter of the GCC-PHAT, i.e., to the time lag (e.g., expressed as ITD) between the two signals provided to the functional unit performing the GCC-PHAT. The color on the two dimensional plane in FIG. 6 corresponds to a value of the GCC-PHAT for a given frame and a given time lag.

In the exemplary time range (i.e., a frame range) between $t_1$ and $t_2$, a plurality of main peaks (each denoted by using a cross and designated as 'peak 1' in the legend of FIG. 6) as determined by the GCC-PHAT functional unit is shown. The GCC-PHAT functional unit may determine the main peaks in accordance with one or more embodiments of the present invention. In the range $t_1$ to $t_2$, a plurality of subordinate peaks (each denoted by using a circle and designated as 'peak 2' in the legend of FIG. 6) as determined by the GCC-PHAT functional unit also is shown. The GCC-PHAT functional unit may determine the subordinate peaks in accordance with one or more embodiments of the present invention).

In the range $t_1$ to $t_2$, the GCC-PHAT function may determine that a plurality of main peaks 610 comprised therein satisfy a stability condition, for example, in view of the locations of the peaks 610 (in terms of the time lag) differing from each other (over a range of consecutive frames) by at most a certain threshold value. Further, the GCC-PHAT function may determine that a plurality of subordinate peaks 615 comprised in the range $t_1$ to $t_2$ satisfy (the same as for the main peaks 610 or a differently parametrized) stability condition, for example, despite of the locations of the peaks 620 showing some scattering for at least a range of consecutive frames in the portion of the range $t_1$ to $t_2$ adjacent to $t_2$. As a result, the GCC-PHAT function (or, for example, a different functional unit comprised in the block 530) may determine that an interfering talker is present in view of the stability condition being satisfied for the peaks 610 and 615.

In another exemplary range $t_3$ to $t_4$, the main peaks 620 exhibit a similar pattern as in the range $t_1$ to $t_2$. Therefore, the fulfilment of the stability condition may be determined by the GCC-PHAT functionality. For a plurality of subordinate peaks 625, the GCC-PHAT functionality may determine that at least some of the peaks 625 do not satisfy a stability condition in view of the scattering pattern (i.e., significantly differing locations in terms of the time lag for at least some subranges of consecutive frames). As a result, the absence of the interfering talker may be determined view of only one of the two evaluated stability conditions being satisfied.

For the exemplary ranges $t_5$ to $t_6$ as well as $t_6$ to $t_7$, the determinations may correspond to the determinations in the range $t_3$ to $t_4$ in view of the stability of the main peaks and the scattering of the subordinate peaks. For the exemplary range $t_8$ to $t_9$, the determinations may correspond to the determinations made for the range $t_1$ to $t_2$ in view of the stability of the main peaks and the subordinate peaks.

Figure 7:
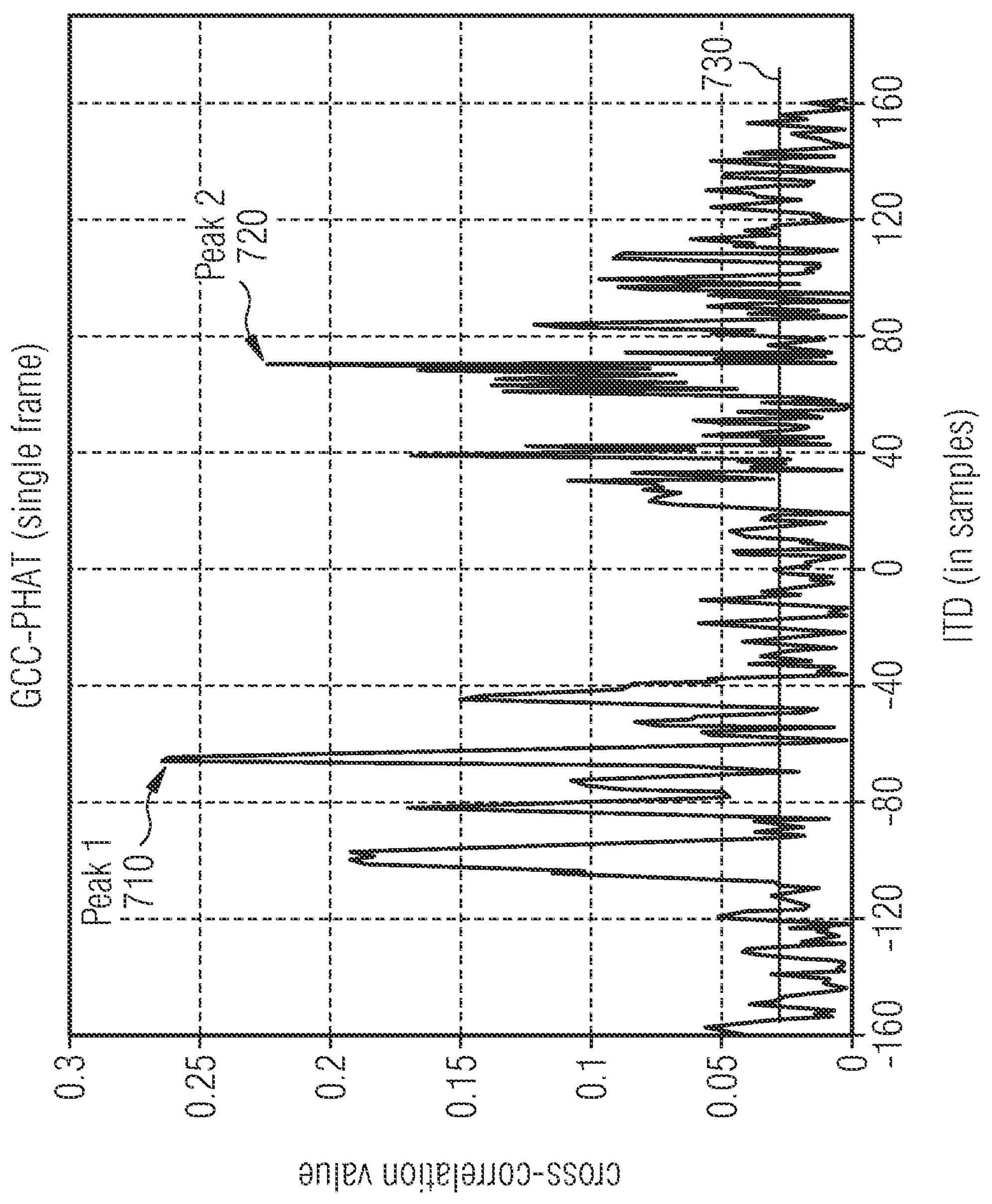
FIG. 7 shows a representation of a correlation function.

FIG. 7 shows an evolution of a GCC-PHAT for an exemplary single frame, for example, one of the frames shown in FIG. 6. In FIG. 7, the abscissa relates to the time lag parameter and corresponds to the ordinate of FIG. 6. The ordinate of FIG. 7 relates to the value of the cross-correlation, e.g., to value provided by the GCC-PHAT function. For the evolution in FIG. 7, a main peak (denoted as Peak 1, 710) and a subordinate peak (denoted as Peak 2, 720) are determined by the GCC-PHAT function. Both the main peak 710 and the subordinate peak 720 may be determined to satisfy a noise condition in accordance with one or more embodiments of the present invention in view of their respective amplitudes (i.e., the cross-correlation values) having a distance to the cross-correlation value of the noise floor 730 being greater than a threshold value (for example, as defined in accordance with one or more embodiments of the present invention).

In addition, the peaks 710 and 720 may be determined (for example, by the GCC-PHAT function or the block 530 of FIG. 5) to satisfy a significance condition in accordance with one or more embodiments of the present invention in view of having a distance in terms of time lag, i.e., along the abscissa, being greater that a threshold value (for example, as defined in accordance with one or more embodiments of the present invention).

Also, the peaks 710 and 720 may be determined (for example, by the GCC-PHAT function or the block 530 of FIG. 5) to satisfy a different illustrative significance condition in accordance with one or more embodiments of the present invention in view of each having a cross-correlation value being greater than a threshold value (for example, as defined in accordance with one or more embodiments of the present invention, specifically, for example, being greater than the value 0.15 as defined for peak(1) in option 1 below).

Furthermore, the peaks 710 and 720 may be determined (for example, by the GCC-PHAT function or the block 530 of FIG. 5) to satisfy a different illustrative significance condition in accordance with one or more embodiments of the present invention in view of a relationship of the cross-correlation values of the peaks 710 and 720 having a ratio below a threshold value (for example, as defined in accordance with one or more embodiments of the present invention, and explained below by using an example having a constant c=0.8).

It is noted that the present invention is not limited to using the GCC-PHAT but rather any technique capable of providing an indication of a cross-correlation value, i.e., any suitable cross-correlation technique, but also a suitable pattern recognition technique, for example, involving a neural network, may be used.

In the following, further embodiments of the invention are described. The embodiments described below may constitute alternatives or may be considered in addition to the aspects disclosed above. The embodiments described below relate to detecting interfering talkers that are captured with a stereo microphone setup. The embodiments described below are a useful tool, for example, for stereophonic speech codecs that can be used for communicating applications.

With reference to the above description, for some particular cases, discrete coding of the two stereo channels may be used for a better performance. For the case of interfering talkers, an advantageous embodiment may switch between the parametric model (Mode A) and the discrete model (Mode B). A further aspect relates to being able to detect automatically when to switch from Mode A to Mode B and from Mode B to Mode A. The following considerations generally apply to the first case, i.e., when to switch from Mode A to Mode B.

An exemplary solution considers an important case (e.g., only the most critical case) when two talkers have different ITDs (Interaural Time Difference) and the difference between the two ITDs is large (significant).

In some embodiments, it may be assumed that the codec already has an ITD estimator and this ITD estimator is based on the GCC-PHAT (Generalized Cross-Correlation Phase Transform) as described for example in [3]. The basic principle of such an estimator is to detect a peak in the GCC-PHAT and this peak corresponds to the ITD of the stereo signal. However, when two talkers are speaking at the same time and they have two different ITDs, there are in most cases two peaks in the GCC-PHAT. Some embodiments detect whether there is only one peak (Mode A) or two peaks far from each other (Mode B) in the GCC-PHAT.

In one embodiment, the starting point may be the Mode A. The GCC-PHAT of the stereo signal may be computed, possibly using a smoothed version of the cross-spectrum or any other processing. The main peak of the GCC-PHAT may be estimated. This may, in most cases, correspond to the maximum of the absolute value of the GCC-PHAT. Alternatively or in addition, some hysteresis mechanism may be applied to have a more stable ITD estimation. A portion of the GCC-PHAT which is sufficiently far from the main peak may be selected. The distance between the main peak and the border of the portion may be above a certain threshold. A second peak in the selected portion may be found: this may be, for example, the maximum of the absolute value of the GCC-PHAT. If the value of the second peak is above a certain threshold, for example, if peak(2)>c*peak(1), where peak(1) and peak(2) are respectively the value of the first and the second peak, and c may be a constant (e.g., c=0.8) or a signal adaptive variable, then the GCC-PHAT may be considered to contain two significant peaks and switching to Mode B may occur. Otherwise, there is no significant second peak, and Mode A remains in use.

Further, embodiments/options are disclosed below:

In option 1, a check that peak(1) is above a certain threshold (e.g., 0.15) may be performed to avoid switching on noisy frames.

In option 2, both conditions of the two above embodiments may be useful to be verified on two consecutive frames. This may avoid switching on unstable signals.

In option 3, peak(2) of two consecutive frames may be useful to close to each other (e.g., their difference may be below 4). This may avoid switching on unstable signals.

In option 4, the SAD flag of the previous frame has to be 1 (meaning it is an active signal). This may avoid switching at the first frame of a signal portion.

In option 5, peak(1) may change abruptly from one frame to the next by a big difference. In that case, check for a second peak may not be required, and it may be considered that a second speaker started talking and switching to Mode B may occur.

In some embodiments, after the GCC-PHAT detector determines whether or not there are interfering talkers as described in one or more of the above embodiments: if no interfering talkers are detected system remains in its default parametric mode and the estimated ITD value may be forwarded to the parametric processing as described, for example, in [1]. If there are interfering talkers detected system may switch to an L-R coding scheme, e.g., code separately each channel using the EVS codec [4].

The described embodiments achieve to detect interfering speech segments for stereophonic speech signals under certain conditions for which it may be advantageous to switch from a parametric stereo coding system to a discrete one. In that manner, the perceptual quality of the codec may be improved. For a parametric coding scheme, an Inter-Channel Time Difference (ITD) detector may be present in some codecs. As a result, additional complexity overhead or additional delay may be acceptable.

The following aspects are further disclosed and can be used individually or—optionally—in combination with any of the features, functionalities and details disclosed herein:

Aspect 1: A stereo speech coding system, where the codec may switch from a parametric coding mode (Mode A) to a discrete L-R coding mode (Mode B) once a classifier/signal analyzer determines the conditions are met to do so.

Aspect 2: A stereo speech coding system, where the codec may switch from a parametric coding mode (Mode A) to a discrete L-R coding mode (Mode B) once a classifier/signal analyzer detects that the signal breaks the underlying model of the parametric coding scheme.

Aspect 3: A stereo speech coding system, where the codec switches from a parametric coding mode (Mode A) to a discrete L-R coding mode (Mode B) once the system detects interfering talkers.

Aspect 4: For stereo speech coding, using the PHAT generalized cross-correlation to detect a first maximum absolute value (peak) and a second highest absolute value and depending on the conditions that apply for the second highest absolute value to detect interfering speech segments.

FIG. 6 discussed above is visualization of the above explained steps/aspects/embodiments, where the scatter plot of the signal is plotted and in FIG. 7, where a zoom of a single frame representation is shown.

6. Audio Encoder According to FIG. 8

Figures 1, 8:
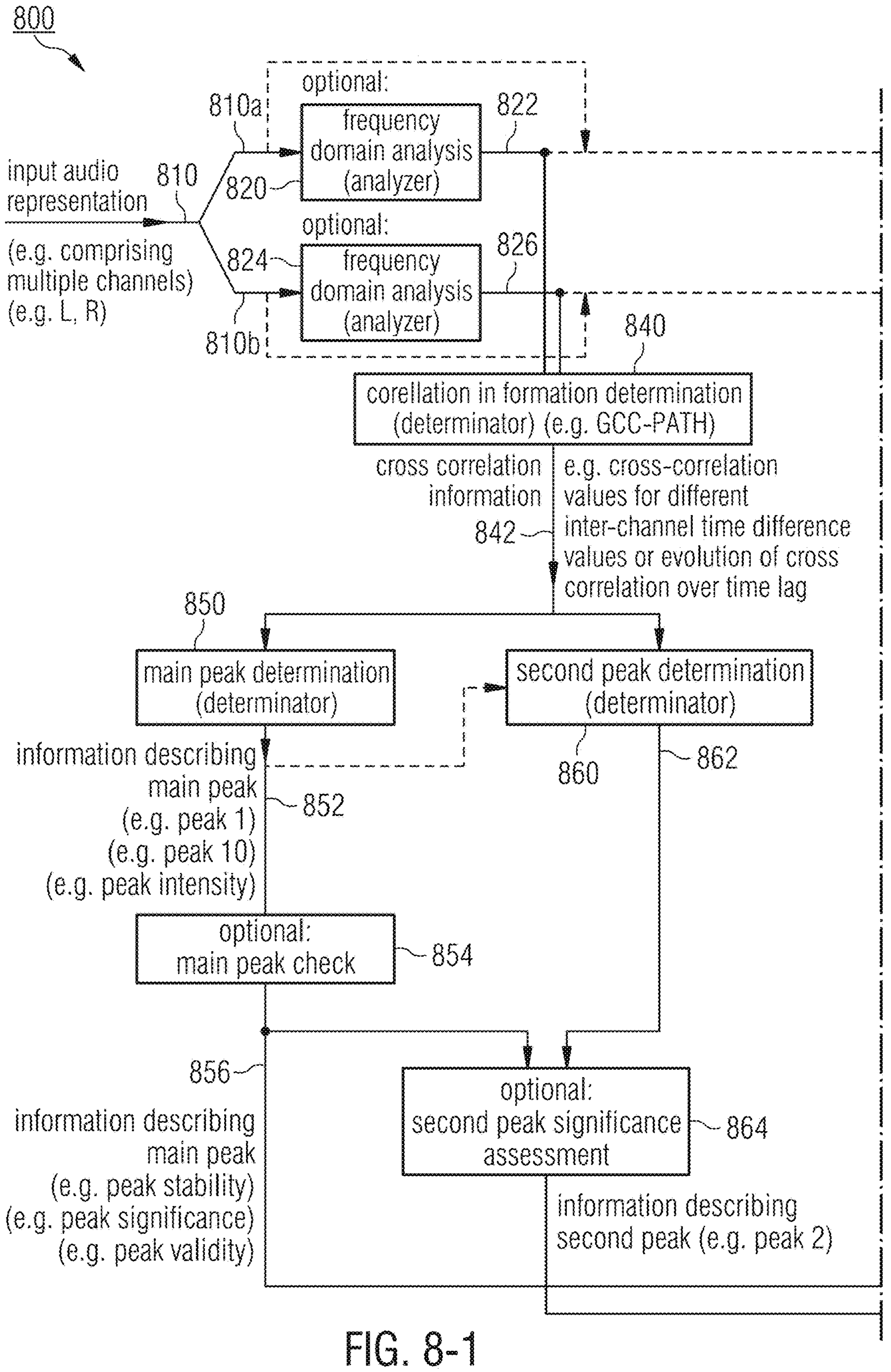
FIG. 8 shows a block schematic diagram of an audio encoder, according to an embodiment.
Figures 2, 8:
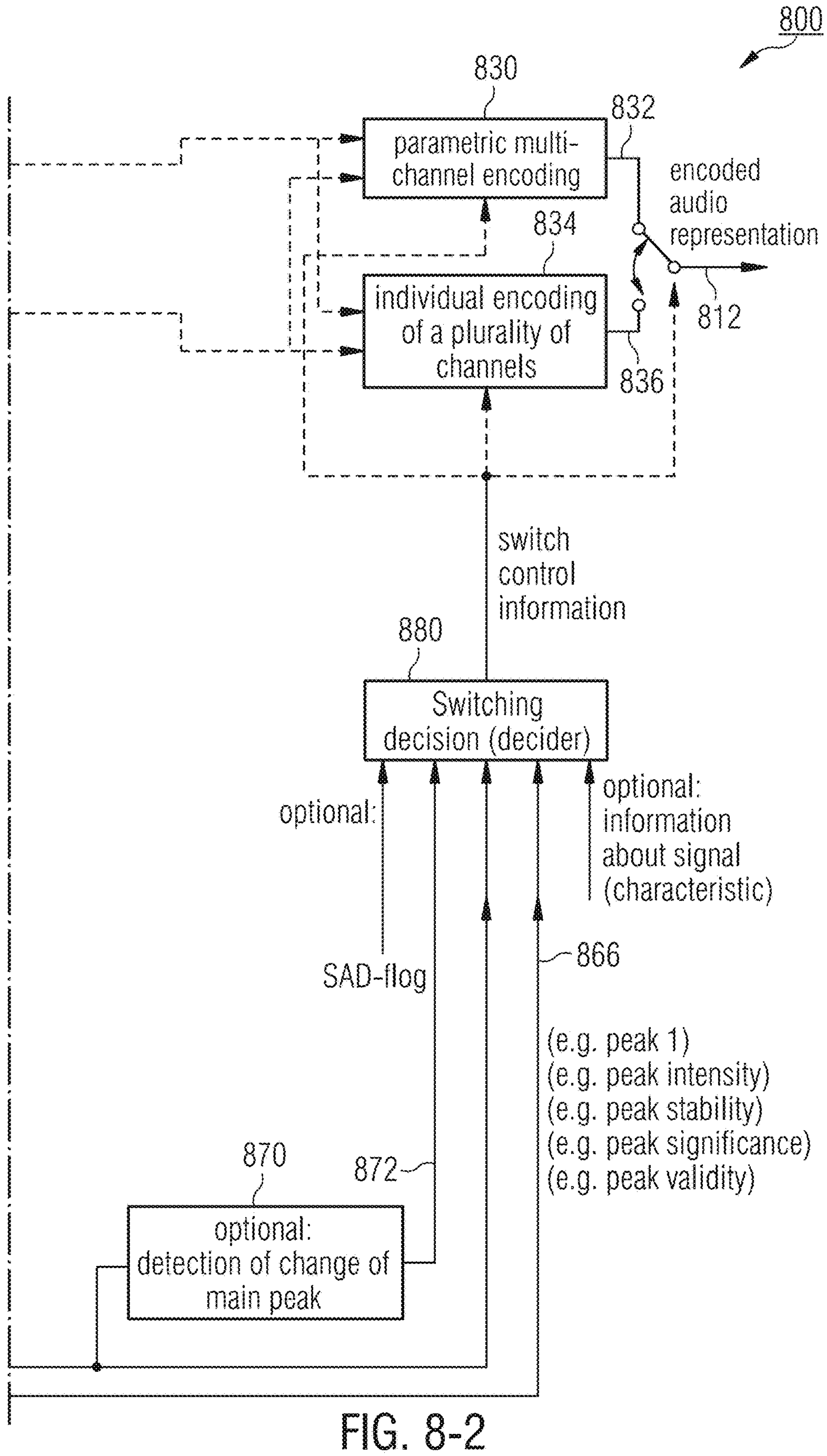

FIG. 8 shows a block schematic diagram of an audio encoder 800, according to an embodiment of the present invention.

The audio encoder 800 receives an input audio representation 810, which may, for example, comprise multiple channels (e.g. channels L, R). The audio encoder 800 provides an encoded audio representation 812, which may, for example, represent the audio content of the input audio representation.

The audio encoder 800 optionally comprises a first frequency domain analysis 820, which receives, for example, a first channel 810*a* of the input audio representation and provides, on the basis thereof, a frequency domain representation 822 of this first channel 810*a*. The audio encoder 800 optionally comprises a second frequency domain analysis 824, which receives, for example, a second channel 810*b* of the input audio representation and provides, on the basis thereof, a frequency domain representation 826 of this second channel 810*b*. For example, the first and second frequency domain analysis may provide frequency domain representations or spectral domain representations 822, 826 of the channels of the input audio representation, for example using a short-term Fourier transform, a MDCT transform, a Filterbank, or the like.

The audio decoder 800 also comprises a parametric multi-channel encoding 830 and an individual encoding 834 of a plurality of channels. For example, the multi-channel encoding 830 may receive the channels 810*a*, 810*b* of the input audio representation or, alternatively, the frequency domain representations 822,826 provided by the frequency domain analysis 820,824. Alternatively, however, the multi-channel encoding may receive a different representation of the channels of the input audio representation. The parametric multi-channel encoding provides an encoded representation of the two or more channels input into the parametric multi-channel representation 832, wherein the channels of the input signal representation may, for example, be represented using a combined signal (e.g. a downmix signal) representing, for example, signal components which are similar in all the channels (or at least in some of the channels, e.g. two or more of the channels) of the input signal representation, and using a parametric side information which describes, for example in the form of parameter values, similarities and/or differences between two or more of the channels of the input audio representation. For example, the parametric side information may comprise inter-channel level difference values and/or inter-channel phase difference values and/or inter-channel time difference values and/or inter-channel correlation values and/or any other parameters describing a relationship between the channels of the input audio representation. The parametric side information may advantageously be usable at the side of an audio decoder to at least approximately reconstruct the channels of the input audio representation on the basis of the combined signal. For example, the parameter values of the parametric side information may be provided individually for different time-frequency ranges or for different spectral bins. For example, the parametric multi-channel encoding may muse a "parametric stereo" concept, which is, for example, used as an extension of MPEG4 High-Efficiency Advanced Audio Coding (HE-AAC), and may provide a corresponding representation of the channels of the input audio representation.

The audio encoder 800 also comprises an individual encoding 834 of a plurality of channels, wherein, for example, the different channels of the input audio representation are encoded individually, for example using an individual encoding of spectral values. Thus, the individual encoding 834 provides separate encoded information 836 associated with the different channels of the input audio representation, which, for example, allows for a separate decoding of the channels of the input audio representation at the side of an audio decoder.

Moreover, the audio encoder is configured to switch between the parametric multi-channel encoding 830 and the individual encoding 834, such that it can be selected, by a control block of the audio encoder, whether the parametric multi-channel representation 832 or the separate encoded information is included in the encoded audio representation 812. Regarding this issue, it is irrelevant whether both the parametric multi-channel encoding 830 and the individual encoding 834 are performed for a given frame and a decision is made whether the encoded representation 832 provided by the parametric multi-channel encoding or the encoded representation 836 provided by the individual encoding is actually included into the encoded audio representation 812, or whether only either the parametric-multi-channel encoding or the individual encoding is selected for a given frame (wherein the latter solution is typically more efficient but may introduce additional delay).

In the following, it will be described how the selection, whether a parametric multi-channel encoding 830 or an individual encoding 834 should be used (or, equivalently, whether a parametric multi-channel representation 832 or a separate encoded information 836 associated with the different channels of the input audio representation) should be included into the encoded audio representation 812.

For this purpose, the audio encoder 800 comprises a decorrelation information determination 840, which may, for example, determine a correlation (e.g. a cross-correlation) between two or more channels of the input audio representation on the basis of the frequency domain representations 822,826 of the channels of the input audio representation. However, it should be noted that the correlation information determination 840 may, for example, operate on the basis of time domain representations of the channels of the input audio representation. Moreover, it should be noted that the correlation information determination may provide separate correlation information 842 for different frequency ranges or time-frequency portions of the input audio representation. Accordingly, there may not only be separate correlation information 842 for subsequent frames of the input audio representation, but there may even be separate correlation information 842 for separate frequency ranges or frequency bins. Also, it should be noted that the correlation information 842 may take the form of a representation of correlation functions (e.g. per time-frequency portion), which comprises different correlation values for different correlation lag values (also designated as lag or time lag).

For example, the correlation information may be obtained using a so-called "GCC-PHAT" technique, which has been found to bring along particularly meaningful results. However, different concepts for the determination of the (cross-) correlation information may also be used.

The audio decoder 800 also comprises a main peak determination 850, which may be configured to determine a main peak of a cross-correlation between two or more channels of the input audio representation (e.g. a maximum of an absolute value of the GCC_PHAT) on the basis of the cross-correlation information and to provide an information 852 describing the main peak (for example, comprising a peak inter-channel time difference or a peak value or a peak intensity). For example, the main peak determination 850 may determine, for which correlation lag (or, equivalently, for which time lag, or, equivalently, for which inter-channel time difference) the cross-correlation information (or a cross-correlation function represented by the cross-correlation information) comprises a (global) maximum value. Optionally, the main peak determinator may also determine the peak value (or peak intensity) itself. However, it should be noted that the main peak determinator does not necessarily need to identify a maximum value of a cross-correlation function as a main peak. Rather, the main peak determinator may, for example, leaf "sporadic" or "unstable" peaks unconsidered and identify a stable peak (e.g. a peak which is stable over a plurality of frames, and which may be classified as "significant", for example larger than a threshold value or over a noise floor by at least a predetermined value) as a main peak (wherein, for example, a hysteresis mechanism may be used to have more stable ITD estimation). It should be noted that may different algorithms for recognizing a peak or main peak of a correlation function can be used, which are all known to the men skilled in the art.

Optionally, the audio decoder also comprises a peak checker 852, which receives the main peak information 852 and checks the main peak information for reliability. For example, the peak checker may identify unreliable main peak information, which comprises large fluctuation (e.g. of the peak ITD and/or of the peak intensity) over time and/or which indicates too small peak intensity. For example, it may be checked whether the value of the main peak is above a certain threshold to avoid switching on noisy frames. Optionally, it may also be determined, whether the main peak fulfils one or more conditions (e.g. with respect to a peak value) over a plurality of frames. To conclude, such unreliable main peak information may be suppressed and/or replaced by default information and/or signaled.

Moreover, the audio decoder may comprise a second peak determination 860, which may be configured to determine a second peak of the cross-correlation between two or more channels of the input audio representation on the basis of the cross-correlation information 842 and to provide an information 862 describing the second peak (for example, comprising a peak inter-channel time difference or a peak value or a peak intensity). For example, the second peak may be a local maximum of the cross-correlation function described by the cross-correlation information 842, which comprises a second-largest peak value after the peak value of the main peak. Additionally, it may optionally be useful for a local maximum of the cross-correlation information to be identified as a second peak that the local maximum fulfils one or more predetermined conditions with respect to the main peak and/or with respect to a noise floor of the cross-correlation function. For example, the second peak determination may receive information regarding the main peak from the main peak determination 850 and consider this information when identifying a second peak. For example, the second peak determination 860 may check whether the distance of a second peak candidate (e.g. a local maximum of the cross-correlation function) comprises a predetermined distance condition (e.g. in terms of a correlation lag or ITD) from the main peak, wherein, for example, it may be useful that a second peak comprises a predetermined minimum distance from the main peak. Alternatively, the determination of the second peak may be performed on the basis of a (selected) portion of the GCC-PHAT which is "far from the main peak", e.g. spaced from the main peak by a predetermined distance in terms of the ITD, wherein, for example, an (absolute) maximum of an absolute value of the GCC- PHAT in the selected portion of the GCC-PHAT may be identified as the second peak.

Alternatively or in addition, the second peak determination may check whether a second peak candidate fulfils a predetermined peak value condition (e.g. in terms of a relationship between peak values of the main peak and of the second peak). For example, it may be useful that the value of the second peak is above a certain threshold, which may be defined relative to a value of the main peak.

Also, the second peak determination may check whether a peak value of a second peak candidate is sufficiently above a noise floor of the cross-correlation information.

Accordingly, the second peak determination 860 may decide whether there is a second peak which fulfills the requirements to be identified as a second peak and provides a second peak information 862 describing the second peak (e.g. in terms of correlation lag and/or ITD and/or peak value and/or peak intensity). Optionally, the second peak information may indicate that there is no second peak which fulfils the conditions.

Optionally, the audio decoder may also comprise a second peak significance assessment 864, which may, for example, receive the second peak information 862 and determine whether the second peak described by the second peak information 862 is significant and/or reliable. For example, the second peak significance assessment may check whether the second peak fulfils one or more conditions over a plurality of frames. For example, the second peak significance assessment may determine whether the second peak is over a certain threshold (e.g. relative to the main peak) for a plurality of frames. Alternatively or in addition, the second peak significance assessment may check whether the correlation lag values or ITD values of the second peak are sufficiently close over two or more (subsequent) frames. However, other conditions of the second peak may optionally also be checked.

It should be noted that the functionalities described with respect to the main peak check 854 may optionally be integrated into the main peak determination 850. Also, the functionalities of the second peak significance assessment may optionally be included into the second peak determination 860. Also, it should be noted that none, some or all of the above mentioned conditions, or additional conditions, may be checked when determining the information 856 describing the main peak and the information 866 describing the second peak.

Furthermore, it should be noted that the information 856 describing the main peak may optionally only indicate whether a valid main peak has been found. Also, the information 866 describing the second peak may optionally only indicate whether a valid second peak has been found. However, the information 856,866 may optionally also describe details regarding the peaks, e.g. correlation lag and/or ITD and/or peak values.

The audio encoder 800 may optionally comprise a detection 870 which detects a change of a correlation lag or of an ITD of the main peak, which is larger than a threshold, and to provide an information 872 describing whether there is such a change.

The audio encoder 800 also comprises a switching decision 880, which is configured to determine whether the parametric multi-channel representation 832 or the separate encoded information 836 associated with the different channels of the input audio representation should be included into the encoded audio representation.

In a simple case the switching decision 880 may simply check whether a significant (or valid) second peak is available or not. If there is only a single peak (i.e. the main peak), the parametric multi-channel encoding 830 may be used (or the parametric multi-channel representation 832 may be included into the encoded audio representation). If a the information 866 describing the second peak indicates that there is a significant (or valid) second peak, the switching decision may decide to use the individual encoding 834 (or to include the separate encoded information 836 associated with the different channels of the input audio representation into the encoded audio representation).

However, the switching decision may optionally use one or more additional criteria for deciding which information should be included into the encoded audio representation.

For example, the switching decision may optionally consider whether there is a change of the main peak which is larger than a (predetermined or variable) threshold, wherein the switching decision may switch to use the individual encoding 834 (or to include the separate encoded information 836 associated with the different channels of the input audio representation into the encoded audio representation) in response to a finding that there is a change of the main peak which is larger than the threshold (which may, for example, be signaled by the information 872).

As another example, the switching decision may optionally consider an indication indicating whether a previous frame has been active or not (e.g. a SAD flag). For example, if the switching decision finds that a previous frame has been inactive, a switching may selectively be suppressed by the switching decision.

However, the switching decision may optionally also evaluate information about other signal characteristics of the input audio representation, and to make the decision which information should be included into the encoded audio representation also on the basis thereof.

To conclude, the audio encoder 800 decides, on the basis of an analysis of characteristics of the input audio representation (e.g. on the basis of a determination how may "significant" or "valid" peaks there are within the cross-correlation function), for example, an a frame-by-frame basis, whether to include the parametric multi-channel representation 832 or the separate encoded information 836 associated with the different channels of the input audio representation into the encoded audio representation.

However, it should be noted that the specific distribution of functionalities to different functional blocks is not essential. Rather, some or all of the functionalities can be combined into a single functional block, if desired.

Also, it should be noted that the audio encoder 800 can optionally be supplemented by any of the features, functionalities and details disclosed herein, both individually and taken in combination.

Also, any of the features, functionalities and details disclosed here can optionally be introduced into any of the embodiments disclosed herein, both individually and taken in combination.

7. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] S. Bayer, M. Dietz, S. Doehla, E. Fotopoulou, G. Fuchs, W. Jaegers, G. Markovic, M. Multrus, E. Ravelli and M. Schnell, "APPARATUSES AND METHODS FOR ENCODING OR DECODING A MULTI-CHANNEL AUDIO SIGNAL USING FRAME CONTROL SYNCHRONIZATION", WO17125562, 27 Jul. 2017.

[2] M. Schroeder and B. Atal, "*Code-excited linear prediction* (*CELP*): *High-quality speech at very low bit rates*," in *ICASSP '85. IEEE International Conference on Acoustics, Speech, and Signal Processing*, Tampa, FL, USA, 1985.

[3] S. Bayer, M. Dietz, S. Doehla, E. Fotopoulou, G. Fuchs, W. Jaegers, G. Markovic, M. Multrus, E. Ravelli and M. Schnell, "APPARATUS AND METHOD FOR ENCODING OR DECODING A MULTI-CHANNEL SIGNAL USING A BROADBAND ALIGNMENT PARAMETER AND A PLURALITY OF NARROWBAND ALIGNMENT PARAMETERS", WO17125558, 27 Jul. 2017.

[4] 3GPP TS 26.445, Codec for Enhanced Voice Services (EVS); Detailed algorithmic description.

The invention claimed is:

1. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel audio encoder is configured to determine whether there are interfering sources in the input audio representation and to switch in dependence on the determination.

2. The multi-channel encoder of claim 1, wherein the multi-channel encoder is configured to determine whether the input audio representation fulfills an assumption of a model underlying the parametric multi-channel encoding and to switch in dependence on the determination.

3. The multi-channel encoder of claim 2, wherein the multi-channel encoder is configured to switch to the individual encoding if the assumption of the model underlying the parametric multichannel encoding is not fulfilled.

4. The multi-channel encoder of claim 1, wherein the multi-channel encoder is configured to determine whether the input audio representation corresponds to a dominant source and to switch in dependence on the determination.

5. The multi-channel encoder of claim 1, wherein the multi-channel encoder is configured to determine whether there is a single dominant source in a plurality of time-frequency portions, and/or to determine whether there are two or more sources in a given time frequency portion, multi-channel encoding parameters of which differ at least by a predetermined deviation or by more than a predetermined deviation, and to switch in dependence on the determination.

6. The multi-channel encoder of claim 1, wherein the multi-channel encoder is configured to determine a parameter of a model underlying the parametric multi-channel encoding and to switch in dependence on the parameter of the model.

7. The multi-channel encoder of claim 1, wherein the multi-channel encoder is configured to determine whether a characteristic defining a relationship between channels of the input audio representation allows for an unambiguous determination of a multi-channel encoding parameter or indicates two or more different possible values of the multi-channel encoding parameter and to switch in dependence on the determination.

8. The multi-channel encoder of claim 1, wherein the multi-channel encoder is configured to determine whether a characteristic defining a relationship between channels of the input audio representation comprises only a single significant value, which fulfils a significance condition, or whether the characteristic defining the relationship between channels of the input audio representation comprises two or more significant values which fulfil the significance condition and to switch in dependence on the determination.

9. The multi-channel encoder of claim 1, wherein the multi-channel encoder is configured to determine a parameter of a previous frame and switch in dependence on the parameter of the previous frame.

10. The multi-channel encoder of claim 1, wherein the multi-channel encoder is configured to determine whether there are two or more values describing a relationship between two or more channels of the input audio representation, which fulfill a significance condition and which are associated with a single time-frequency portion and to switch in dependence on the determination.

11. The multi-channel encoder of claim 1, wherein the multi-channel encoder is configured to determine whether there are two or more peaks in a cross-correlation between two or more channels of the input audio representation, and to switch in dependence on the determination.

12. The multi-channel encoder of claim 1, wherein the multi-channel encoder comprises an estimator configured to estimate a relationship between two or more channels of the input audio representation based on a cross-correlation, and the multi-channel encoder is configured to determine whether a difference between two peak values associated with different cross-correlation lag is greater than a value and to switch in dependence on the determination.

13. The multi-channel encoder of claim 1, wherein the multi-channel encoder is configured to determine whether a distance between two or more values describing a relationship between two or more channels of the input audio representation, which fulfill a significance condition and which are associated with a same time-frequency portion, is greater than a value and to switch in dependence on the determination.

14. The multi-channel encoder of claim 1, wherein the multi-channel encoder is configured to determine a first characteristic value based on an evolution of a cross-correlation and switch in dependence on the determination.

15. The multi-channel encoder of claim 1, wherein the multi-channel encoder is configured to determine one or more subordinate characteristic values based on the evolution of the cross-correlation and to switch in dependence on the determination, and/or wherein the multi-channel encoder is configured to determine whether there are one or more subordinate characteristic values based on the evolution of the cross correlation, and to switch in dependence on the determination.

16. The multi-channel encoder of claim 1, wherein the multi-channel encoder is configured to determine whether the main peak and the one or more subordinate peaks fulfill a significance condition and switch in dependence on the determination, and/or wherein the multi-channel encoder is configured to determine whether there are one or more subordinate peaks of the cross correlation which fulfil a relevance criterion and to switch in dependence on the determination.

17. The multi-channel encoder according to claim 1, wherein the multi-channel encoder is configured to selectively consider a subordinate peak in a given frame of the input audio representation if there have been one or more corresponding subordinate peaks in one or more frames preceding the given frame.

18. The multi-channel encoder of claim 1, wherein the multi-channel encoder is configured to determine whether one or more characteristic values, which describe a relationship between two or more channels of the input audio representation fulfill a stability condition and switch in dependence on the determination.

19. The multi-channel encoder of claim 1, wherein the multi-channel encoder is configured to determine whether a noise condition is fulfilled for a number of frames and to selectively avoid switching if the noise condition is fulfilled.

20. The multi-channel encoder of claim 1, wherein the multi-channel encoder is configured to determine whether the significance condition and/or the stability condition for the characteristic value is fulfilled for a number of frames and to switch in dependence on the determination.

21. The multi-channel encoder of claim 1, wherein the multi-channel encoder is configured to determine whether a distance of the one or more subordinate peaks is in a predetermined range and to switch and/or to selectively avoid switching in dependence on the determination.

22. The multi-channel encoder of claim 1, wherein the multi-channel encoder is configured to selectively avoid a switching at or after a first frame after an inactive frame of the input audio representation, and/or the multi-channel encoder is configured to determine whether a given flag in a frame has changed relative to one or more previous frames and to selectively avoid switching in dependence on the determination.

23. The multi-channel encoder of claim 1, wherein the multi-channel encoder is configured to selectively switch to the individual encoding in response to a detection of a change of a characteristic of the input audio representation which is larger than a threshold.

24. The multi-channel encoder of claim 1, wherein the multi-channel encoder is configured determine whether a parameter describing a direction of a sound source has changed by at least a value and to switch in dependence on the determination.

25. A multi-channel audio decoder for providing a decoded audio representation on the basis of an encoded audio representation, wherein the multi-channel audio decoder is configured to switch between a parametric multi-channel decoding of a plurality of channels and an individual decoding of a plurality of channels;

wherein the multi-channel audio decoder is configured to switch between the parametric multi-channel decoding and the individual decoding in dependence on a signaling comprised by the encoded audio representation.

26. A method of multi-channel audio encoding for providing an encoded audio representation on the basis of an input audio representation, the method comprising switching between a parametric multi-channel encoding of a plurality of channels and an individual encoding of a plurality of channels in dependence on characteristics of the input audio representation;

wherein the method comprises determining whether there are interfering sources in the input audio representation and switching in dependence on the determination.

27. A non-transitory digital storage medium having a computer program stored thereon to perform the method of multi-channel audio encoding for providing an encoded audio representation on the basis of an input audio representation, the method comprising:

switching between a parametric multi-channel encoding of a plurality of channels and an individual encoding of a plurality of channels in dependence on characteristics of the input audio representation, wherein the method comprises determining whether there are interfering sources in the input audio representation and switching in dependence on the determination when said computer program is run by a computer.

28. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether there is a single dominant source in a plurality of time-frequency portions, or whether there are two or more sources in a given time frequency portion, multi-channel encoding parameters of which differ at least by a predetermined deviation or by more than a predetermined deviation, and to switch in dependence on the determination whether the multi-channel encoding parameters differ at least by the predetermined deviation or by more than the predetermined deviation;

wherein the multi-channel encoding parameters are based on a relationship between channels of the input audio representation; and wherein the multi-channel audio encoder is configured to switch to the parametric multi-channel encoding in the case of a single source.

29. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether a characteristic defining a relationship between channels of the input audio representation comprises only a single significant value, which fulfils a significance condition, or whether the characteristic defining the relationship between channels of the input audio representation comprises two or more significant values which fulfil the significance condition and to switch in dependence on the determination.

30. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether there are two or more values describing a relationship between two or more channels of the input audio representation, which fulfill a significance condition and which are associated with a single time-frequency portion and to switch in dependence on the determination.

31. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether there are two or more peaks in a cross-correlation between two or more channels of the input audio representation, and to switch in dependence on the determination, wherein the cross-correlation relates to a given time-frequency portion.

32. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder comprises an estimator configured to estimate a relationship between two or more channels of the input audio representation based on a cross-correlation, and the multi-channel encoder is configured to determine whether a difference between two peak values associated with different cross-correlation lag is greater than a value and to switch in dependence on the determination.

33. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether a distance between two or more values describing a relationship between two or more channels of the input audio representation, which fulfill a significance condition and which are associated with a same time-frequency portion, is greater than a value and to switch in dependence on the determination.

34. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether a main peak and one or more subordinate peaks fulfill a significance condition and switch in dependence on the determination, and/or wherein the multi-channel encoder is configured to determine whether there are one or more subordinate peaks of the cross correlation which fulfil a relevance criterion and to switch in dependence on the determination.

35. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether one or more characteristic values, which describe a relationship between two or more channels of the input audio representation fulfill a stability condition and switch in dependence on the determination.

36. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to determine whether a noise condition is fulfilled for a number of frames and to selectively avoid switching if the noise condition is fulfilled.

37. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to selectively avoid a switching at or after a first frame after an inactive frame of the input audio representation, and/or the multi-channel encoder is configured to determine whether a given flag in a frame has changed relative to one or more previous frames and to selectively avoid switching in dependence on the determination.

38. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured to selectively switch to the individual encoding in response to a detection of a change of a characteristic of the input audio representation which is larger than a threshold;

wherein the characteristic of the input audio representation is an inter-channel time difference or a main peak of a cross-correlation between two or more channels of the input audio representation.

39. A multi-channel audio encoder for providing an encoded audio representation on the basis of an input audio representation, wherein the multi-channel audio encoder is configured to switch between a parametric multi-channel encoding of a plurality of channels and an individual encoding of a plurality of channels in dependence on characteristics of the input audio representation;

wherein the multi-channel encoder is configured determine whether a parameter describing a direction of a sound source in the input audio representation has changed by at least a value and to switch in dependence on the determination.

* * * * *